United States Patent [19]

Hayashi et al.

[11] Patent Number: 6,014,677

[45] Date of Patent: Jan. 11, 2000

[54] DOCUMENT MANAGEMENT DEVICE AND METHOD FOR MANAGING DOCUMENTS BY UTILIZING ADDITIVE INFORMATION

[75] Inventors: Koichi Hayashi; Akifumi Sekijima, both of Nakai-machi, Japan

[73] Assignee: Fuji Xerox Co., Ltd., Tokyo, Japan

[21] Appl. No.: 08/660,860

[22] Filed: Jun. 10, 1996

[30] Foreign Application Priority Data

Jun. 12, 1995 [JP] Japan ................................ 7-144751
May 28, 1996 [JP] Japan ................................ 8-133684

[51] Int. Cl.[7] .................................................. G06E 17/00
[52] U.S. Cl. ............................... 707/501; 707/3; 707/200
[58] Field of Search ........................ 707/1–206, 501–513

[56] References Cited

U.S. PATENT DOCUMENTS

| | | | |
|---|---|---|---|
| 5,267,175 | 11/1993 | Hooper .................................... | 364/489 |
| 5,280,574 | 1/1994 | Mizuta et al. ........................... | 395/146 |
| 5,452,468 | 9/1995 | Peterson ................................. | 395/800 |
| 5,511,188 | 4/1996 | Pascucci et al. ........................ | 395/600 |
| 5,594,837 | 1/1997 | Noyes ..................................... | 395/63 |
| 5,603,025 | 2/1997 | Tabb et al. .............................. | 395/602 |
| 5,613,148 | 3/1997 | Bezviner et al. ........................ | 395/800 |
| 5,615,360 | 3/1997 | Bezek et al. ............................ | 395/606 |

FOREIGN PATENT DOCUMENTS 0 326 162   8/1989   European Pat. Off. .

OTHER PUBLICATIONS

Marc Andressen, National Center for Supercomputing Applications, "NCSA Mosaic Technical Summary 2.1" (1993), pp. 1–5.

National Center for Supercomputing Applications, NCSA Mosaic for the X Window System User's Guide, "How to Use Annotations," 2 pages.

Primary Examiner—Wayne Amsbury
Assistant Examiner—David Yink Jung
Attorney, Agent, or Firm—Oliff & Berridge, PLC

[57] ABSTRACT

A document management device includes a database for storing and managing document data, a document retrieving device for retrieving the document data from the database, a document display for displaying at least one document data retrieved by the document retrieving device, and a format storage device for storing at least one evaluation format each of which has an identifier and a plurality of definitions of evaluation attributes. The evaluation format specifies the structure of evaluation data representing evaluation for the document data. A document selecting device allows for selection of one document data among the document data displayed, and a format selecting device allows for selection of one of the evaluation formats. An attribute value input device allows for inputting attribute values which are the result of evaluation for the document data selected by the document selecting device from the viewpoint represented by the evaluation attributes defined in the evaluation format. An evaluation data storage device is provided for storing the evaluation data which is a combination of the identifier of the evaluation format and attribute values inputted by the attribute value input device for the evaluation attributes defined by the evaluation format. A binding information creating device creates binding information which binds the document data selected by the document selecting device with the evaluation data stored in the evaluation data storage device. A binding information storage device stores the binding information.

18 Claims, 36 Drawing Sheets

REFERENCE MANAGEMENT

| REFERENCE NUMBER | SORT | FILING DATE | APPLICANT | ABSTRACT |
|---|---|---|---|---|
| Hei○-○○○ | PATENT | 88.1.15 | AAA Co. | □□□□□□□□□□ □□□□□□ |
| HeiX-XXX | PATENT | 89.2.11 | BBB Co. | □□□□□□□□□□ □□□□□□ |
| Hei△-△△△ | PATENT | 90.3.21 | CCC Co. | □□□□□□□□□□ □□□□□□ |
| Hei◇-◇◇◇ | PATENT | 91.4.29 | DDD Co. | □□□□□□□□□□ □□□□□□ |

FIG.3A

ENGINEERING PLANNING DEPARTMENT

| REFERENCE NUMBER | INVESTIGATION DATE | PERSON IN CHARGE | TECHNICAL FIELD | EVALUATION | COMMENT |
|---|---|---|---|---|---|
| Hei○-○○○ | 94.10.10 | AKASHI | DATA BASE | IMPORTANT | GOODS X MAY CONFLICT |
| Hei△-△△△ | 94.10.10 | AKASHI | DOCUMENT PROCESSING | IMPORTANT | NEARLY SAME AS PATENT RELEVANT TO GOODS Y |
| Hei◇-◇◇◇ | 94.10.10 | AKASHI | DATA BASE | IMPORTANT | RELEVANT TO GOODS Y: NOT CONFLICT |

FIG.3B

INTELLECTUAL PROPERTY DEPARTMENT

| REFERENCE NUMBER | INVESTIGATION DATE | PERSON IN CHARGE | ACTION | COMMENT |
|---|---|---|---|---|
| Hei○-○○○ | 94.11.3 | BANDO | AVOIDANCE | GOODS X CONFLICT WITH CLAIM 2 STUDY OF AVOIDANCE IS REQUIRED |
| Hei△-△△△ | 94.11.3 | BANDO | OPPOSITION | MAIN PRODUCTS OF OUR COMPANY CONFLICT.: OPPOSITION IS REQUIRED |

FIG.3C

TAG NAME: ENGINEERING PLANNING DEPARTMENT

| | |
|---|---|
| ATTRIBUTE NAME: | INVESTIGATION DATE |
| ATTRIBUTE VALUE DEFAULT: | %DATE |
| DISPLAY: | NONE |
| INPUT: | NONE |

| | |
|---|---|
| ATTRIBUTE NAME: | PERSON IN CHARGE |
| ATTRIBUTE VALUE DEFAULT: | % USER |
| DISPLAY: | NONE |
| INPUT: | NONE |

| | |
|---|---|
| ATTRIBUTE NAME: | EVALUATION |
| ATTRIBUTE VALUE DEFAULT: | IMPORTANT |
| DISPLAY: | NONE |
| INPUT: | NONE |

| | |
|---|---|
| ATTRIBUTE NAME: | TECHNICAL FIELD |
| ATTRIBUTE VALUE DEFAULT: | |
| DISPLAY: | NONE |
| INPUT: | DO |

| | |
|---|---|
| ATTRIBUTE NAME: | COMMENT |
| ATTRIBUTE VALUE DEFAULT: | |
| DISPLAY: | DO |
| INPUT: | DO |

INPUT EVALUATION INFORMATION

TAG NAME: ENGINEERING PLANNING DEPARTMENT

[OK] [CANCEL]

| INVESTIGATION DATE: | 94.10.10 |
| --- | --- |
| PERSON IN CHARGE: | AKASHI |
| EVALUATION: | IMPORTANT |
| TECHNICAL FIELD: | DATA BASE |
| COMMENT: | GOODS X MAY CONFLICT |

FIG.9B

INPUT EVALUATION INFORMATION

| TECHNICAL FIELD: | COMMENT: | ENGINEERING PLANNING DEPARTMENT |
| --- | --- | --- |
|  |  |  |

[OK] [CANCEL]

ENGINEERING PLANNING DEPARTMENT

| REFERENCE URL | INVESTIGATION DATE | PERSON IN CHARGE | TECHNICAL FIELD | EVALU-ATION | COMMENT |
|---|---|---|---|---|---|
| http://xxx/yyy/NEW-PRODUCT.html | 94.10.08 | AKASHI | DATA BASE | IMPOR-TANT | COMPETITIVE GOODS TO GOODS X |
| http://zzz/NEW INDEX.html | 94.10.09 | ITO | DOCUMENT PROCESSING | REFER-ENCE | VERSION UP OF PRODUCTS OF Z Co. |
| http://aaa/PRESS/941010.html | 94.10.12 | AKASHI | DATA BASE | IMPOR-TANT | PRESS RELEASE REGARDING GOODS Y OF A Co. |
| http://bbb/NEW-DOC/INDEX.html | 94.10.13 | ITO | DOCUMENT PROCESSING | IMPOR-TANT | NEW DOCUMENT FORMAT PROPOSED BY B Co. |
| http://ccc/ddd/DOC.html | 94.10.20 | AKASHI | DATA BASE | REFER-ENCE | PAPER OF C UNIVERSITY REGARDING DATA BASE |

FIG.26

ENGINEERING PLANNING DEPARTMENT

| IDENTIFIER REFERENCE | INVESTIGATION DATE | PERSON IN CHARGE | TECHNICAL FIELD | EVALU-ATION | COMMENT |
|---|---|---|---|---|---|
| http://xxx/yyy/NEW-PRODUCT.html | 94.10.08 | AKASHI | DATA BASE | IMPOR-TANT | COMPETITIVE GOODS TO GOODS X |
| http://zzz/NEW INDEX.html | 94.10.09 | ITO | DOCUMENT PROCESSING | IMPOR-TANT | VERSION UP OF PRODUCTS OF Z Co. |
| Hei○-○○○ | 94.10.10 | AKASHI | DATA BASE | IMPOR-TANT | GOODS X MAY CONFLICT |
| Hei△-△△△ | 94.10.10 | AKASHI | DOCUMENT PROCESSING | IMPOR-TANT | NEARLY SAME AS PATENT RELEVANT TO GOODS Y |
| Hei◇-◇◇◇ | 94.10.10 | AKASHI | DATA BASE | IMPOR-TANT | RELEVANT TO GOODS X: NOT CONFLICT |
| http://aaa/PRESS/941010.html | 94.10.12 | AKASHI | DATA BASE | IMPOR-TANT | PRESS RELEASE REGARDING GOODS Y OF A Co. |
| http://bbb/NEW-DOC/INDEX.html | 94.10.13 | ITO | DOCUMENT PROCESSING | IMPOR-TANT | NEW DOCUMENT FORMAT PROPOSED BY B Co. |
| http://ccc/ddd/DOC.html | 94.10.20 | AKASHI | DATA BASE | IMPOR-TANT | PAPER OF C UNIVERSITY REGARDING DATA BASE |

FIG.27

| SUPPLY SECTION | REQUEST DATE | PERSON IN CHARGE | SORT | COMMENT | OBJECT |
|---|---|---|---|---|---|
| FIRST DEVELOPMENT DEPARTMENT | 94.10.30 | HIRAI | DATA BASE | USE FOR PERFORMANCE COMPARISON INVESTIGATION | http://xxx/yyy/NEW-PRODUCT.html |
| FIRST DEVELOPMENT DEPARTMENT | 94.11.04 | HIRAI | APPLICATION | USE FOR DEVELOPMENT HELP | http://ooo/PRESS/941010.html |

| SUPPLY SECTION | PERSON IN CHARGE | CONTENTS | COMMENT | REGISTRATION DATE | REFERENCED |
|---|---|---|---|---|---|
| 94.10.17 | AKASHI | PREPARATION OF REPORT IN EXHIBITION PARTICIPATION | COMPETITIVE GOODS TO GOODS X | 94.10.08 | http://xxx/yyy/NEW-PRODUCT.html |
| 94.10.18 | AKASHI | ORDER OF WHOLE DOCUMENT OF OFFICIAL GAZETTE | GOODS X MAY CONFLICT | 94.10.10 | O-OOO |

```
<h1>NEW INFORMATION </h1>

<p>1995.12.10
<a href="http://xxx/yyy/NEW-
PRODUCT.html">RELEASE START OF NEW PRODUCTS
</a></p>

<p>1995.12.1
LINK DESTINATION IS ADDED. </p>

<p>1995.11.10
NEW
<a href="http://www/INDEX.html">
WWW SERVER </a>
IS OPENED.</p>
```

PUBLISHED UNEXAMINED PATENT
JPA Hei ○-○○○
FILING DATE: 1988.1.15
APPLICANT: AAA Co.

ABSTRACT

IMPORTANT: RELEVANT TO DATA BASE

GOODS X CONFLICT WITH CLAIM 2.
STUDYING OF AVOIDANCE IS REQUIRED.
         1994.11.3
INTELLECTUAL PROPERTY DEPARTMENT
                          BANDO 10.10
RTMENT
AKASHI

FIG.44A

PUBLISHED UNEXAMINED PATENT
JPA Hei ○-○○○
FILING DATE: 1988.1.15
APPLICANT: AAA Co.

| INVESTIGATION DATE | PERSON IN CHARGE | TECHNICAL FIELD | SECTION |
|---|---|---|---|
| 94.10.10 | AKASHI | DATA BASE | ENGINEERING PLANNING DEPARTMENT |
| EVALUATION | COMMENT | | |
| IMPORTANT | GOODS X MAY CONFLICT | | |

FIG.44B

DOCUMENT MANAGEMENT DEVICE AND METHOD FOR MANAGING DOCUMENTS BY UTILIZING ADDITIVE INFORMATION

BACKGROUND OF THE INVENTION

1. Field of the Invention

The present invention relates to a document management device which manages documents by utilizing additive information.

2. Description of the Related Art

In general, in investigation activity, a series of procedures such as collection of reference materials, evaluation of each reference materials, and utilization of evaluation result, are performed. Information given as evaluation result to a reference includes decision whether it is necessary or not, evaluation of value such as importance, comment regarding contents or the like. Selection, sorting and creating visual presentation of references are performed utilizing the given evaluation information.

Evaluation information for a reference is not information originally accompanying the reference, but it is information reflecting the viewpoint or criteria of the evaluator himself. That is, there is criterion or purpose for evaluation, and the evaluation information is given in response to the criterion or purpose. Also the evaluation may vary depending on difference of the evaluator or the evaluation date. Consequently, when selection or sorting of references is performed using the evaluation information, it is preferable that information regarding the viewpoint for the evaluation, such as the criterion of evaluation, purpose, evaluator, and evaluation date, is clear.

In many cases, the investigation covering only a specific type of references is not sufficient. References provided by unlimited range of information sources should be covered. For example, when known information of the patent is investigated, not only documents of the patent gazette but also information such as a treatise, an article in a newspaper or a magazine, and a catalog of products must be aimed at.

In recent years, a database device for managing documents and a device for creating charts using data stored in the database are developed. Consequently if the reference data and the evaluation information can be suitably inputted in the database, a series of procedures from collection of references to utilization of the evaluation information can be helped. In order to perform such a series of works smoothly, there are criteria to be satisfied as follows.

(1) The evaluation information can be attached to references by simple operation at will.

(2) The viewpoint for giving the evaluation can be simply defined and utilized.

(3) Various types of reference materials can be aimed at for the evaluation. Regarding respective criteria to be satisfied, the prior art and methods by using this and problems in such cases will be described.

First, a method in the prior art for supplying the reference data with the evaluation information simply and freely will be described. Difficulty due to feature of the work of evaluating references is an essential problem common not only for the case of inputting information electronically but also for the case of inputting information using paper. First, the feature of the work of evaluating references will be described, and a method in the case of using references of paper will be put in order.

Evaluation of references and utilization of the evaluation results is not always performed at once. For example, before analyzing collected documents, some amount of evaluation results must be registered. Also when the evaluation is performed by plural persons, the evaluation results by each person in charge must be gathered before discussing and comparing them. Thus in the investigation activity, in many cases, relation of a reference and its evaluation information must be maintained from the evaluation of the reference to the utilization of the evaluation result.

In the case of the investigation using a reference of paper, as one method of supplying the evaluation information to the reference, there is a method that a memo having specific meaning or a memo with the evaluation information written therein is attached to a reference or a list of reference names. As a method besides this, for example, there is a method that the reference and the evaluation information are recorded in a separate management ledger or a method that the evaluation information is written directly in the reference. In the method of using the management ledger, however, the reference and the evaluation information must be referred in correspondence to each other every time and this work is troublesome. Also since the evaluation information is essentially different from the information of the reference, and, for example, the evaluation information may be changed therefore it is not preferable that the evaluation information is written directly in the reference.

FIG. 43 to FIG. 46 are explanation diagrams of an example of the memo attaching. FIG. 43 to FIG. 45 show image of the memo attaching. FIGS. 43A and 43B show an example that memos giving different decisions of evaluation to the same reference are attached. FIG. 44A shows an example that plural memos are attached to one reference simultaneously. FIG. 44B shows an example that various columns are previously provided on a piece of paper for memo to be attached to a reference, and the evaluation method is guided. Further, FIG. 45 shows an example that different pieces of paper for memo are used, and the evaluation information is used commonly in plural departments.

The attaching of a memo is not limited to the case that a memo is attached directly to a reference. For example, in examples shown in FIGS. 46A and 46B, memos are attached to the list of references. In this case, memos are attached to positions where corresponding references can be specified thereby relating between the reference and the memo is performed. Thus the memos are attached under various purposes and configurations.

In the method of attaching memos, the reference and the memo are independent media, and since this method is characterized in that the relating between the reference and the memo is performed by coupling of both, there are advantages as follows.

First, since the reference and the memo are independent media, it can be seen at a glance of the reference whether the evaluation information exists or not. Therefore the loss or forgetting of the evaluation information can be prevented. Also content of the evaluation information and content of the original reference can be easily distinguished. Further since it can be seen at a glance by a person other than the evaluator whether the evaluation information exists or not, the evaluation information can be used commonly between plural persons.

Further the evaluation information given as a result of reading the reference can be related to the reference by attaching a memo directly to the reference without referring to the management ledger or the like. Also being different from writing it directly in the reference, if the coupling between the reference and the memo is eliminated, the relating can be eliminated thereby this method is advantageous in that the evaluation information can be supplied in carefree manner.

Thus according to the attaching of the memo by medium independent of the reference data, the evaluation information can be supplied easily and freely. However, this work has been performed based on paper. Consequently, since the information is not inputted in electronic manner, the computer processing utilizing the supplied evaluation information can not be performed.

In order to utilize such memo effectively, the memo may be converted into that in electronic manner. For example, Japanese Patent Publication No. Hei 1-18470 (1989) discloses a method of supplying the memo information in image form to a document stored in a specific document database. Also in a document image filing device disclosed in Japanese Patent Laid-Open No. 6-236409 (1994), a user can write a handwritten memo into a document image. Afterwards the document image with the memo added thereto can be retrieved under condition whether the memo exists or not. However, the retrieval enabled in such a device by attaching the memo is limited only to that based on whether the memo exists or not. Also since only the handwritten image information is used as information of the memo, it is fundamentally difficult that the retrieval of highly utilizing the content of the memo, for example, the above-mentioned evaluation information becomes possible.

Also devices are developed where information of a memo can be held not as image but as text. In Japanese Patent Laid-Open No. Hei 5-2584 (1993), memos in various shapes including comment by text can be applied within a document. Also in Japanese Patent Laid-Open No. Hei 5-165829 (1993), edit comment described in the text information is written in a memo which is attached or detached to a portion requiring edit within a document thereby the edit in cooperation is helped. In any of the devices, a memo is allowed to hold a piece of text information to reduce the difficulty of the information input operation, and the information written in the memo is used only for displaying the information together with the document data.

As technology utilizing tag, some systems intend to call data with tag attached thereto in sequence among the database, that is, so-called tag turning. Among them, in Japanese Patent Laid-Open No. Hei 7-56934 (1995), plural types of tags are used thereby different tag turning can be performed in respective types. In this system, the tag information can possess the attribute information capable of setting not only the type information but also the order, and using such information, the access of the database is controlled. However, the tag used in this invention only has simple structure and can provide only simple retrieval function. This is insufficient for purpose of putting the reference data in order.

Next, the viewpoint of applying the evaluation to the reference data will be simply defined, and conventional manner of utilizing the reference data will be described. The evaluation information for the reference is not information essentially accompanying the reference, but reflects the viewpoint or the criteria of the evaluator. In other words, the information having the new value not existing in the original reference is created. Supply of the evaluation information is performed in itself, for example, by the attaching of a memo as above described. It is preferable that the evaluation information described in this memo is effectively utilized.

Since the reference and the memo are media independent of each other, prescribed columns may be provided on a piece of paper for memo and the evaluation method can be guided. By using the same paper for memo, the evaluation method can be standardized independently of sorts of references. Conversely, by using plural types of memos, the evaluation information in plural evaluation standard can be attached.

The attaching of the above-mentioned memo is utilized not only in the investigation activity but also widely in activity in offices. For example, the work command is described in a memo and attached to a document. Also in this case, the content of the memo is not information accompanying the document essentially, and it is other information but does not exist separated from the document.

The evaluation information is information supplied from the viewpoint of the evaluator essentially and does not accompany the original document in itself. Consequently, the giving manner of columns in the memo reflecting the own sense of value possessed by the evaluator is important. Columns in the memo are suitably provided, thereby the information describing the viewpoint when the evaluation was performed, such as the purpose, order, evaluator and evaluation date, can be held. Thus, if common structures of the memo, which is a medium independent of the reference data, are prepared, the evaluation information can be given under an uniform standard even though sorts or locations of the primary information are different.

However, as long as structure of the information regarding columns of the memo is expressed on medium of paper, it can only fill the role to guide the input information to the evaluator. Also there is a problem that the work of writing the information of the evaluator or the like every time is troublesome.

In a document creation/management system described in Japanese Patent Laid-Open No. Hei 4-80871 (1992), a user inputs information indicating the sort of a document and attribute data by filling a field accompanying the document, and then the document is registered in the database. According to this system, the user is not conscious of operation of the database and only writes prescribed data in the document thereby the database can be registered. This attribute information can be used in place of a memo. In this system, however, the user can only input the necessary data in the database where the management method is determined in each sort of the document. Each document has only one set of the attribute fields to register the information accompanying the document. The user can not register various pieces of the evaluation information to the document.

Finally, the prior art will be described where the evaluation information such as comment can be attached to many and various reference data. In any of the prior art where the evaluation information is supplied to the image data, only document data in the document management database prepared peculiarly become the evaluation purposes. In this point, circumstances are the same in constitution described in any of Japanese Patent Publication No. Hei 1-18470 and Japanese Patent Laid-Open Nos. Hei 6-236409, 5-2584, 5-165829, 756934 and 4-80871 as above described. However, such constitution is not suitable for the investigation activity covering large amount and various sorts of the reference data from the diverse information source, since all of the usable data cannot be registered into the internal database.

On the other hand, recent progress of the computer network represented by the Internet makes it possible to access to various information resources in the world through the network from the computer near at hand. Under such circumstances, as technology of treating the reference data distributed and managed in various information sources, global information system called WWW (World Wide Web) is developed based on hypertext. In the WWW, based on the server-client model, data are sent or received between a server managing the document and a client retrieving the document from the server according to the request of the user.

The document stored in the server is supplied with URL (Universal Resource Locator) being unique identifier for specifying the document according to agreement for the transmission/reception of data. Since the URL includes the information of the server where the document is stored, if the client assigns the URL only, the server can be specified and accessed and the document can be fetched.

The document treated in the WWW is hypertext described generally format called HTML (HyperText Markup Language). In the HTML, tags constituted by the special strings are embedded within the document, thereby the document format form or the link of the hypertext is expressed. The link is expressed using the URL, thereby the document stored in other server as the reference destination of the link can be assigned. Consequently, in the framework of the WWW, the hypertext network extending over a plurality of servers can be constructed.

As a client of the existing WWW having function of supplying comment to the document described in the HTML being the reference data managed by such various information sources, there is Mosaic developed in NCSA of Illinois University. Regarding the Mosaic, refer to, for example, "NCSA Mosaic Technical Summary 2.1," 1993. If the user uses the Mosaic and accesses the document on the WWW server and commands to supply the comment, a file taking correspondence of the content of the comment to the URL of the document is created. Next, when the document is displayed in the Mosaic, the link representing comment not existing in the original document is displayed at the end of the document. If the user assigns the link representing the comment, the content of the comment is read from the associated file and displayed on the screen other than the original document.

In this method, although the comment attached to various reference data can be given, the given comments are referred only in the procedure which is first accessing the reference data then displaying comments related to the data. This method does not provide the function to attach comments to reference data from the various viewpoints and manage reference data by using attached comments.

In summary, such prior art does not exists that allows to define the evaluation information based on the user's viewpoint, to attach the evaluation information to various reference data at will by simple operation, and to manage reference data by using the related evaluation information.

SUMMARY OF THE INVENTION

In view of the above-mentioned circumstances in the prior art, an objective of the present invention is to provide a document management device where advantage of a method of memo attaching is utilized profitably, and a user can register information in various aspects for documents in simple operation, and such information can be utilized in document management, for example, arrangement, sorting and retrieval of documents.

More generally, when handling the original document as primary information and additionally attached information like evaluation result as secondary information, an objective of the present invention is to help smoothly proceed a series of works including definition of relevant information as secondary information to documents managed as the primary information from the user's viewpoint and management of primary information by using the registered secondary information.

Another objective of the present invention is maintaining correspondence between the primary information and secondary information to enable users to define evaluation information at will by simple operation. Another objective of the present invention is enabling users to prepare format of the secondary information attached to the primary information as expressing the viewpoint of the evaluator . Further objective of the present invention is enabling users to manage the primary information provided by various information sources uniformly from the own viewpoint of the evaluator by utilizing the secondary information bound with the primary information.

According to one aspect of the present invention, there is provided a document management device comprising: a database for storing and managing document data; document retrieving means for retrieving the document data from said database; document display means for displaying at least one document data retrieved by said document retrieving means; format storage means for storing at least one evaluation format each of which has an identifier and a plurality of definitions of evaluation attributes, said evaluation format specifying the structure of evaluation data representing evaluation for the document data; document selecting means for selecting one document data among the document data displayed by said document display means; format selecting means for selecting one of the evaluation formats stored in said format storage means; attribute value input means for inputting attribute values which are the result of evaluation for the document data selected by said document selecting means from the viewpoint represented by the evaluation attributes defined in the evaluation format selected by said format selecting means; evaluation data storage means for storing the evaluation data which is a combination of the identifier of the evaluation format selected by said format selecting means and attribute values inputted by said attribute value input means for the evaluation attributes defined by the evaluation format; binding information creating means for creating binding information which binds the document data selected by said document selecting means with the evaluation data stored in said evaluation data storage means; and binding information storage means for storing the binding information created by said binding information creating means.

According to another aspect of the present invention, there is provided a document management device comprising: a database for storing and managing document data; format storage means for storing at least one evaluation format each of which has an identifier and a plurality of definitions of evaluation attributes, said evaluation format specifying the structure of the evaluation data representing evaluation for the document data; evaluation data storage means for storing the evaluation data, which is a combination of the identifier of the evaluation format stored in said format storage means and attribute values for the evaluation attributes defined by the evaluation format; binding information storage means for storing binding information which binds the document data stored in said database with the evaluation data stored in said evaluation data storage means; retrieval condition input means for inputting the evaluation attribute and the attribute value for the evaluation attribute as retrieval condition; evaluation data retrieval means for retrieving the evaluation data fitted to the retrieval condition from said evaluation data storage means; and document data retrieval means for retrieving the document data bound to the evaluation data retrieved by said evaluation data retrieval means, based on the binding information stored in said binding information storage means.

According to further aspect of the present invention, there is provided a document management method of managing document data stored in a storage device, said method comprising: registering at least one evaluation format each of which has an identifier and a plurality of definitions of evaluation attributes, said evaluation format specifying the structure of evaluation data representing evaluation for the document data; obtaining at least one document data from said storage device; displaying obtained document data; selecting one document data from the displayed document data; selecting one evaluation format from said at least one registered evaluation format; inputting attribute values which are the result of evaluation for the selected document data from the viewpoint represented by the evaluation attributes defined by the selected evaluation format; storing the evaluation data which is a combination of the identifier of the selected evaluation format and the inputted attribute values for the evaluation attributes defined by the evaluation format; creating binding information which binds the selected document data with the stored evaluation data; and storing the created binding information.

According to still another aspect of the present invention, there is provided a document management method of managing document data stored in a storage device, said method comprising: registering at least one evaluation format each of which has an identifier and a plurality of definitions of evaluation attributes, said evaluation format specifying the structure of the evaluation data representing evaluation for the document data, evaluation data which is a combination of the identifier of the evaluation format and attribute values for the evaluation attributes defined by the evaluation format, and binding information which binds the document data with the evaluation data; inputting the evaluation attribute and the attribute value for the evaluation attribute as retrieval condition; retrieving the evaluation data fitted to the retrieval condition from said registered evaluation data; and retrieving the document data bound to the retrieved evaluation data based on the registered binding information.

BRIEF DESCRIPTION OF THE DRAWINGS

FIGS. 3A–3C are explanation diagrams of an exemplification of relation describing document dependent information and document evaluation information;

FIG. 4 is an explanation diagram of an exemplification of a tag template;

FIGS. 9A–9B are an explanation diagrams of another example of a display screen of an evaluation information input tool inputting evaluation information;

FIG. 26 is an explanation diagram of another exemplification of relation describing document dependent information and document evaluation information;

FIG. 27 is an explanation diagram of still another exemplification of relation describing document dependent information and document evaluation information;

FIGS. 44A–44B are explanation diagrams of another example of memo attaching;

DESCRIPTION OF THE PREFERRED EMBODIMENTS

Figure 1:
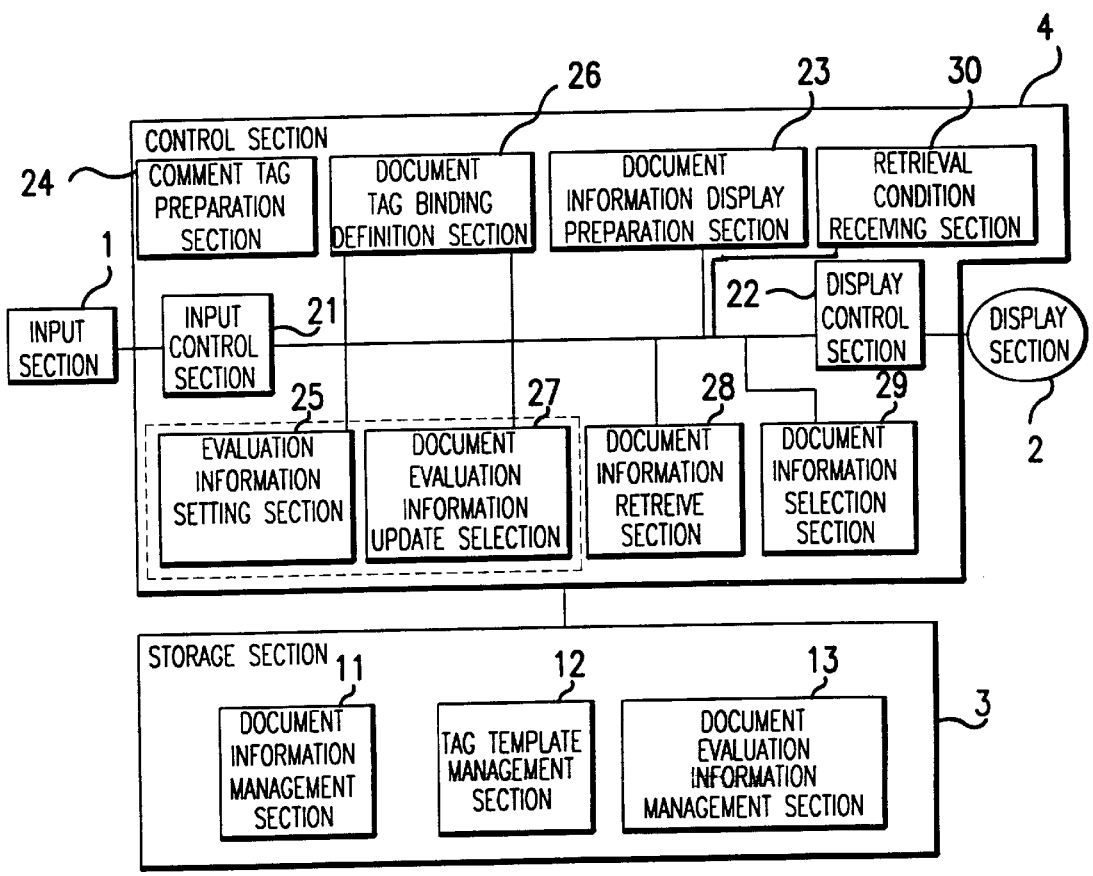
FIG. 1 is a block constitution diagram showing an example of a document processing device to which a first embodiment of a document management device of the invention is applied.

FIG. 1 is a block configuration diagram showing an example of a document processing device to which a first embodiment of a document management device of the present invention is applied. In FIG. 1, numeral 1 designates an input section, numeral 2 designates a display section, numeral 3 designates a storage section, numeral 4 designates a control section, numeral 11 designates a document information management section, numeral 12 designates a tag template management section, numeral 13 designates a document evaluation information management section, numeral 21 designates an input control section, numeral 22 designates a display control section, numeral 23 designates a document information display preparation section, numeral 24 designates a comment tag preparation section, numeral 25 designates an evaluation information setting section, numeral 26 designates a document-tag binding definition section, numeral 27 designates a document evaluation information update section, numeral 28 designates a document information retrieving section, and numeral 29 designates a document information selection section. Although the following description illustrates an example that uses additive information to represent evaluation of document, the usage of additive information is not limited to this sort and may be used for represent information associated with various sorts of purposes. In the following description, an electronic tag is called a comment tag.

In the input section 1, a user inputs document processing a command or document data. For example, the input section 1 may be constituted by a keyboard or a mouse. The display section 2 displays document data, document dependent information, comment tags or the like. The display section 2 is constituted, for example, by a display device.

The storage section 3 stores data as object of processing. For example, the storage section 3 is constituted by various storage devices such as a semiconductor memory and a magnetic storage device. The storage section 3 has the document information management section 11, the tag template management section 12, the document evaluation information management section 13 and the like. The document information management section 11 manages the document data together with dependent information on the document. The tag template management section 12 manages a tag template having information necessary for creation of the comment tag. The document evaluation information management section 13 manages evaluation information for the document.

The control section 4 controls the processing. For example, the control section 4 is constituted by a CPU. The control section 4 comprises the input control section 21, the display control section 22, the document information display preparation section 23, the comment tag preparation section 24, the evaluation information setting section 25, the document-tag binding definition section 26, the document evaluation information update section 27, the document information retrieving section 28, and the document information selection section 29 and retrieval condition receiving section 30. The input control section 21 controls the input section 1 in order to take a command from a user. For example, the input control by standard window system can be performed. The display control section 22 controls the display section 2 so as to display document information or a tag. For example, the display control by standard window system can be performed. The document information retrieving section 28 takes out document information from the storage section 3. If retrieval condition is passed from the retrieval condition receiving section 30, the document information retrieving section 28 takes out the document information which satisfies the retrieval condition. The taken-out data are delivered to the document information display preparation section, for example, so as to create the display information. The document information display preparation section 23 creates the display information so as to display the document information, and delivers the display information to the display control section 22. In this embodiment, the display information is created so as to display the document information in a list.

The comment tag preparation section 24 selects a piece of information of the tag template managed by the tag template management section 12 based on the command of the user, and creates the comment tag. Creation of the comment tag implies the presenting all or a part of the evaluation information to users as a unit to be treated. This does not necessarily mean that the independent data structure to hold the evaluation information is created in each comment tag.

For example, comment tags may be prepared as some query to define a set of the evaluation information to be combined, and when the display of the comment tag becomes necessary, the comment tag may be presented to the user as a virtually generated view.

The document information selection section 29 selects a piece of the document information among the document data taken in the document information retrieving section 28 in response to the command of the user. The evaluation information setting section 25 sets the evaluation data to the comment tag created in the comment tag preparation section 24. The document-tag binding definition section 26 relates the comment data created in the comment tag preparation section 24 to the document data selected in the document information selection section 29. The document evaluation information update section 27 updates the evaluation information regarding the related document data based on the evaluation data set in the comment tag.

The retrieval condition receiving means 28 receives the retrieval condition which is inputted by the user through the input section. Then the received retrieval condition is passed to the document information retrieve section.

Figure 2:
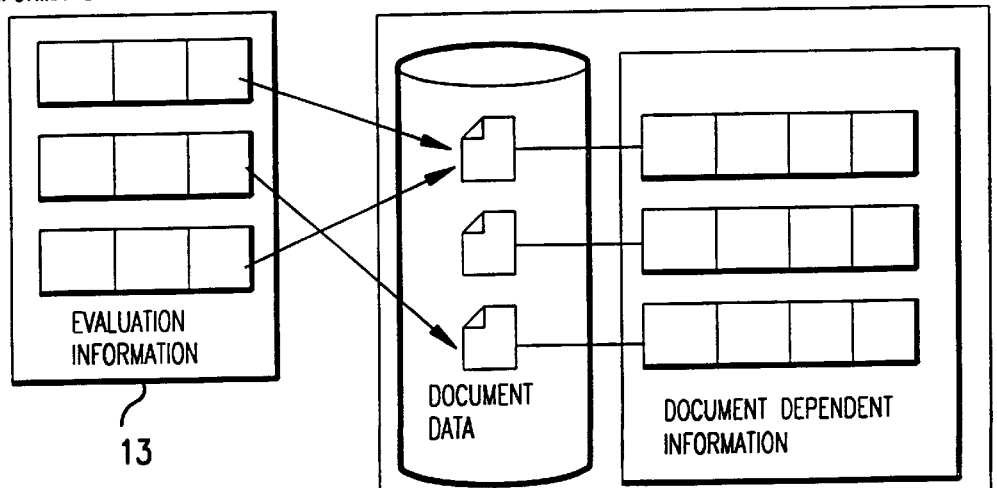
FIG. 2 is a concept diagram showing relation of information managed in a document information management section and a document evaluation information management section.

FIG. 2 is a concept diagram showing relation of information managed in the document information management section 11 and the document evaluation information management section 13. The document information management section 11 manages the document data and the document dependent information accompanying the document data. The document data are data constituting the document, for example, image data of document, text data, chart data and table data. The document dependent information is a set of data originally attached to the document data, for example, author, creation date and name. In general, the different sort of documents has different sort of dependent information. For example, in the case of patent reference, information such as filing date, applicant, abstract are included in the document dependent information. In any case, the document dependent information is universal information inherent to the nature of the document data itself, and only one set of dependent information is attached to each document data and its values are constant independently of the viewpoint of each evaluator.

The document evaluation information management section 13 manages the evaluation information as above described. The evaluation information is information related to the document data based on the viewpoint or criteria of the evaluator. The evaluation information generally does not have relation to the document data body. For example, the evaluation information includes the importance in the specific business process, department in charge, readers of the reference. The document data is not always bound with the evaluation information, or plural pieces of the evaluation information may be bound with the same document data. For example, the document management system in the prior art represented by Japanese Patent Laid-Open No. Hei 4-80871 as above described, has the document information management section 11 but does not have the document evaluation information management section 13. As described later, the binding information indicating which document is bound with the evaluation information is also stored.

In the concept diagram shown in FIG. 2, in order to make the explanation easy, the document evaluation information management section 13 and the document information management section 11 are separated, and further the document information management section 11 is shown so as to manage the document data and the document dependent information separately. The present invention is not limited to such configuration in the working. The document evaluation information management section and the document information management section may be the same actually. Also the document dependent information may be constituted so as to be embedded within the document data.

Here both the document dependent information and the document evaluation information are implemented as relation within the relational database separately from the document data. FIG. 3 is an explanation diagram of an exemplification of relation describing the document dependent information and the document evaluation information. The reference management relation manages the document dependent information. The engineering planning department relation and the intellectual property department relation manages the evaluation information of references from the viewpoint of respective departments. The document data are prepared separately, and binding of the document dependent information and the document evaluation information in the relational database with the document data is indicated by the reference number that works as an identifier of the document data. In addition, that called relation here means the data structure of the table treated within the relational database.

In this example, in the database, the document evaluation information and the document dependent information are represented as different relation, each of which is maintained to satisfy respective properties. That is, the document dependent information necessarily accompanies the document data from its property, and must be constituted on the premise that it has the universal content. In order to make such setting, for example, as shown in Japanese Patent Laid-Open No. Hei 4-80871, the document dependent information may be set as a user inputs the determined set of attribute value at registration of the document. In addition, the database to be utilized is not limited to the relational database. Any system which can manage data using combination of an attribute name and an attribute value may be utilized.

The tag template management section 12 manages the tag template as above described. The tag template is constituted by a tag name and a field list. It is a format to input the evaluation information. The tag name is a name of the tag template. The field list is constituted by list of the field information. The field information is constituted by an attribute name, an attribute value default, a display flag, an input flag or the like. The attribute name is a name of attribute. The display flag assigns whether the field is displayed or not when the tag display is performed. The input flag assigns whether the user inputs the evaluation information to the field when the evaluation information is inputted. The attribute value default defines a value to be displayed as a default value when the evaluation information is inputted. As the default value, the variable evaluated during inputting the evaluation information can be defined. For example, if %DATE is made variable indicating date and %USER is made variable indicating a user name and these are assigned as values, the values evaluating these variables can be set as field values during inputting the evaluation information.

In the comment tag, various pieces of evaluation information can be specified as set of the attribute name and the attribute value. Then, due to limitation of the display space or the easy understanding, in some cases, it is better that all pieces of the evaluation information are not displayed. Also some attribute values can be calculated automatically, and the user need not input all attribute values. The display flag, the input flag and the attribute value default as above described provide such functions.

FIG. 4 is an explanation diagram of an exemplification of the tag template. The exemplification of the tag template shown in FIG. 4 corresponds to the evaluation information of the engineering planning department shown in FIG. 3B. In the example of the tag template shown in FIG. 4, the name of the tag template is "engineering planning department," and a list of five pieces of field information succeeds it. For example, the first field information has the attribute name "investigation date" and the date is given as the default value of this field. Also it is indicated that when the attribute information is inputted, the value of the field need not be inputted and is not displayed as the comment tag. In this tag template, the inputting of the evaluation information may be only in the fields of the technical field and the comment. In each of the fields of the investigation date, the person in charge and the evaluation, the default value is set. Also that displayed as the comment tag is only the field of the comment.

The information defined by the tag template includes information which is defined as scheme of relation by the relational database. This embodiment is on the premise that the definition of the tag template and the scheme of the relation are coincident. In this embodiment, a method of maintaining such relation always is not particularly specified, but, for example, if the database system is extended so as to enable the definition of the tag template thereby the definite information is held at one position, the consistency between the definitions can be held easily. Of course, the database to be utilized is not limited to the relational database.

In this embodiment, when defining the tag template, the corresponding schema of the relational database is defined, and the invention is realized so that the data registration to the corresponding database is performed at the inputting process of the evaluation information. The present invention is not limited to that it is realized particularly by the relational database, and also not limited to that the definition of the template and the inputting of the evaluation information are performed in this procedure. For example, at inputting the comment tag, the field may be added or deleted freely. As the database realizing such function, for example, it can be realized by using the database to treat the semi-structured message. Also when the database without scheme or the definition of class is adopted, as the new comment tag, an example of the comment tag is always copied and used thereby a method of utilizing the comment tag created in the past as a tag template may be adopted. Also the template may be virtually defined by processing of extracting the common part of a plurality of comment tags or the like.

Figure 6:
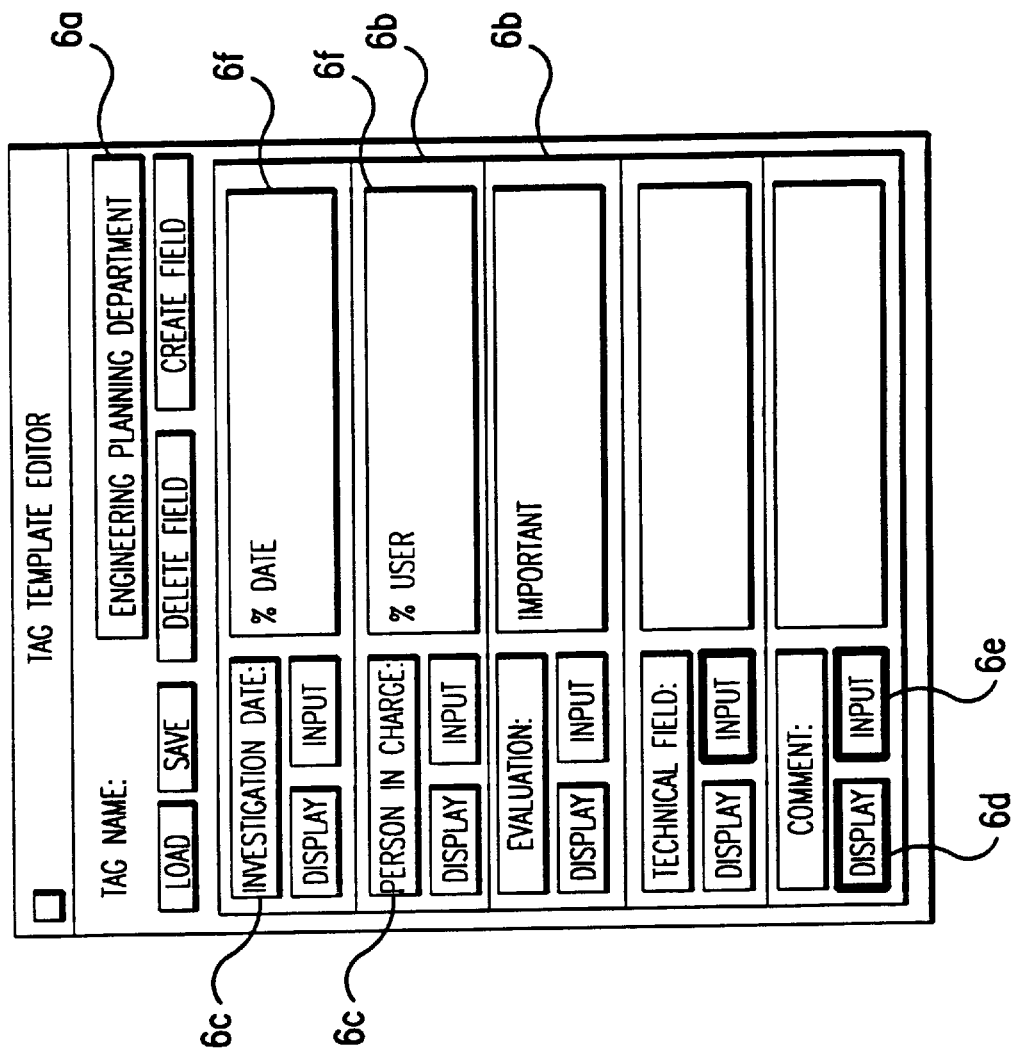
FIG. 6 is an explanation diagram of an example of a display screen of a tool defining tag template.

Next, an example of operation in the first embodiment of the present invention will be described. FIG. 6 is an explanation diagram of an example of a display screen of a tool defining a tag template. The tag template can be created, for example, using an editor as shown in FIG. 6. In the display screen shown in FIG. 6, an area 6a inputting a tag name and areas 6b defining each field are arranged, As buttons, a "load" button reading other tag template, a "save" button holding the defined tag template, a "delete field" button deleting a field, and a "create field" button adding and inserting a new field are prepared. Also in the area defining each field, areas 6c inputting an attribute name, display buttons 6d and input buttons 6e changing state of a display flag and an input flag, and areas 6f inputting attribute value default are provided. The display button and the input button are varied in the display state in response to the state of the display flag and the input flag. In FIG. 6, as an example, the buttons set to the display state or the input state are shown by thick lines. The display button and the input button can be commanded by a user using a mouse or the like, and every time the command is committed, state of the display flag or the input flag can be changed.

In FIG. 6, as an example, the screen defining the tag template in FIG. 4 is shown. In the area inputting the tag name, "engineering planning department" is inputted. Each field of the investigation date, the person in charge, the evaluation, the technical field and the comment is defined. For example, in the field of the investigation date, "%DATE" is inputted as the attribute value default. Also in the field of the technical field, the input flag is s et to the input state.

In the state shown in FIG. 6, the "save" button is pushed down, thereby the tag template data having the displayed content are stored in the template management section 12. At the same time, the scheme definition command of the relational database is committed. When the tag template shown in FIG. 6 is defined, for example, the command as follows is committed thereby relation of the database is defined. In addition, in this example, other detailed information to be described, such as declaration of the data type of respective attribute, is omitted. CREATE TABLE engineering planning department (investigation date, person in charge, evaluation, technical field, comment)

Figure 5:
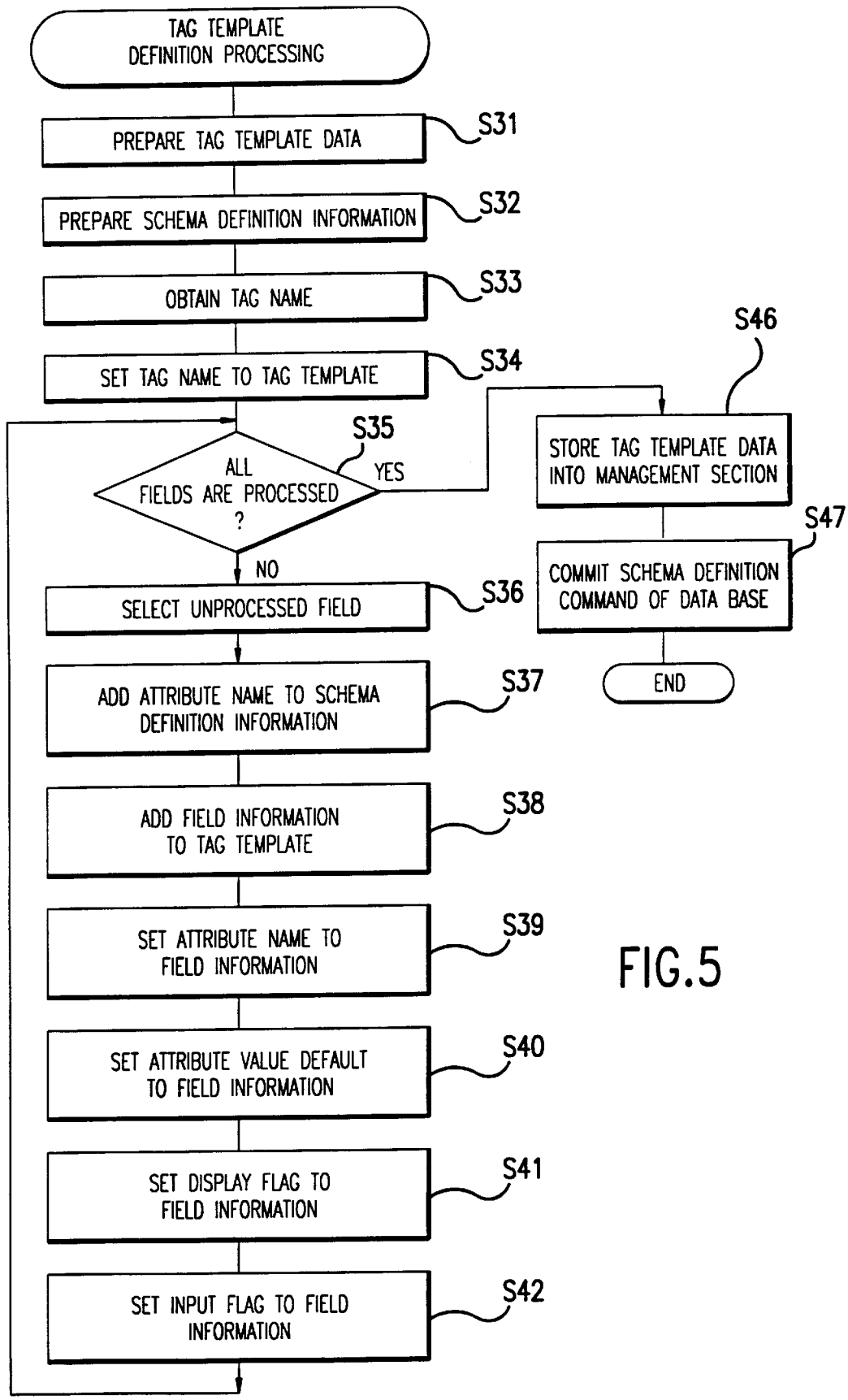
FIG. 5 is a flow chart showing an example of definition processing of the tag template in the first embodiment of the document management device of the invention.

FIG. 5 is a flow chart showing an example of the definition processing of the tag template in the first embodiment of the document management device in the present invention. This flow chart is called when the tag name and the attribute name and the flag of each field are set and the "save" button is pushed down on the tag template editor shown in FIG. 6. The defined tag template is managed by the tag template management section 12, for example, as tag template data shown in FIG. 4. In this case, database schema of the corresponding document evaluation information management section 13 is defined.

At S31, the data structure describing the tag template is created and initialized. Also at S32, the data structure of the scheme definition information to define the scheme is created and initialized. The data structure becomes a list of attribute name. Further at S33, for example, the tag name inputted from the definition tool or the like of the tag template is obtained, and at S34, the obtained tag name is set as a value of the tag name of the tag template data.

At S35, decision is effected regarding whether the definition processing of all fields is finished or not, and when the processing is finished, process is transferred to S46. At S36, one of the unprocessed fields is selected.

At S37, the attribute name corresponding to the field information is added to the schema definition information. Also at S38, the field information is created and added to the tag template data. For the created field information, the attribute name is set at S39, the default value is set as the attribute value at S40, the default value is set as the display flag at S41, and the default value is set as the input flag at S42. Thus the new field information is added as a list of the tag template.

When processing of all fields is finished, at S46, the tag template data are stored in the tag template management section 12. Also at S47, the schema definition command of the relational database is committed. Thereby relation of the database is defined. The new tag template data have been defined by above-mentioned processing. Of course, the tag template data previously defined can be corrected, and a new tag template can be defined using the tag template previously defined.

Next, processing of inputting the evaluation information using the created tag template will be described. At inputting of the evaluation information, for example, the evaluation information input tool can be used. In the evaluation information input tool, an area is provided for inputting the evaluation information corresponding to the field information, on receiving the command of the tag name from the user, based on the tag template corresponding to the tag name. The data inputted in the area are taken as the evaluation information.

FIG. 8 is an explanation diagram of an example of a display screen of the evaluation information input tool for inputting the evaluation information. Creation of the evaluation information stored and managed in the document evaluation information management section 13 can be performed according to the tag template managed in the tag template management section 12. For example, when the tag template as shown in FIG. 4 is defined, a value is set regarding each field within the tag template thereby the evaluation information can be created. Then only a field with an input flag in a tag template set to inputted state, that is, only attribute to be inputted by the user, may be presented to the user.

Figure 7:
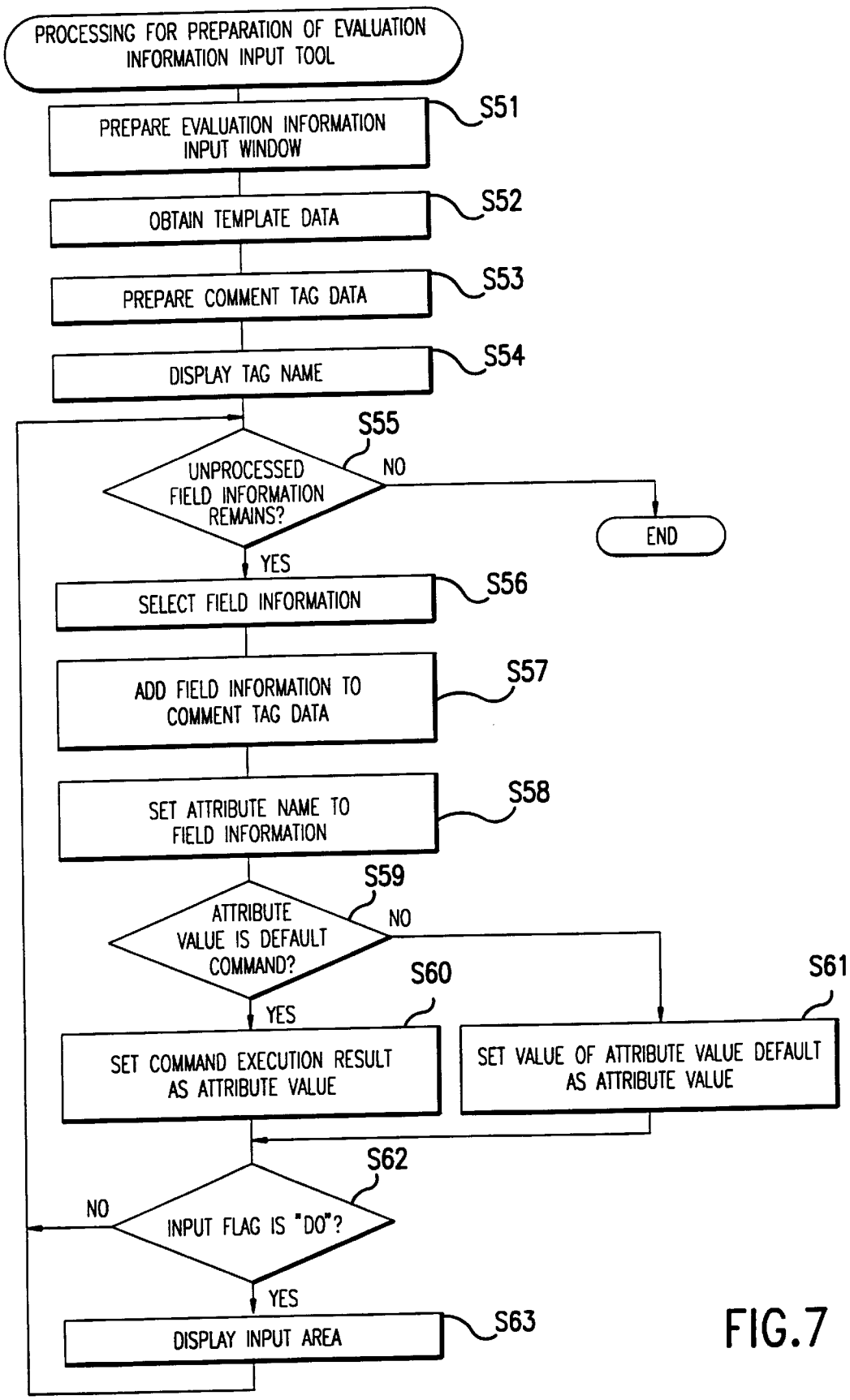
FIG. 7 is a flow chart showing an example of processing for preparation of an evaluation information input tool inputting evaluation information in the first embodiment of the document management device of the invention.

FIG. 7 is a flow chart showing an example of processing for preparation of the evaluation information input tool in the first embodiment of the document management device of the present invention. At S51, an evaluation information input window is created and buttons or the like to be displayed commonly are displayed. At S52, data of the tag template commanded by the tag name or the like from the user are obtained from the tag template management section 12. On the other hand, at S53, the data structure expressing the comment tag is created. The data structure becomes a list of the field information. At S54, the tag name is obtained from the data of the tag template and displayed in the evaluation information input window.

At S55, decision is effected regarding whether the unprocessed field information remains or not in the data of the tag template. When the processing is finished regarding information of all fields, processing for preparation of the evaluation information input tool is finished. If the unprocessed field information remains, at S56, the unprocessed field information is selected from the data of the tag template. At S57, the field information corresponding to the selected field information is created and added to the comment tag data. At S58, the attribute name is taken out from the field information of the tag template and set to the field information of the comment tag data.

Here at S59, decision is effected regarding whether a value of the attribute value default corresponding to the set attribute name is a command or not. If the value of the attribute value default is a command, at S60, the command is executed and the value of the result is set as the attribute value of the field information of the comment tag. If the value of the attribute value default is not a command, at S61, the value of the attribute value default left intact is set as the attribute value of the field information of the comment tag.

At S62, decision is effected regarding the value of the input flag of the field information of the tag template. Only when the value of the input flag is "do," at S63, the field input area holding the attribute value is created and displayed in the evaluation information input window. Returning to S55, the processing is repeated regarding other unprocessed field information. Thus processing is performed regarding information of all fields, and regarding the commanded tag template, the input area of the evaluation information corresponding to the field information with the value of the input flag "do" is displayed in the evaluation information input window. The user may input the evaluation information in the displayed input area.

Figure 8A:
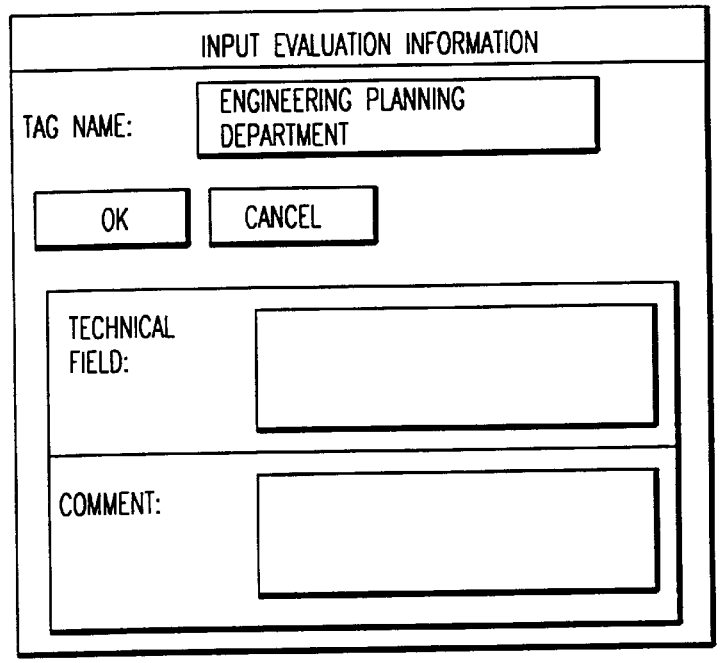
FIGS. 8A–8B are an explanation diagrams of an example of a display screen of an evaluation information input tool inputting evaluation information.
Figure 8B:
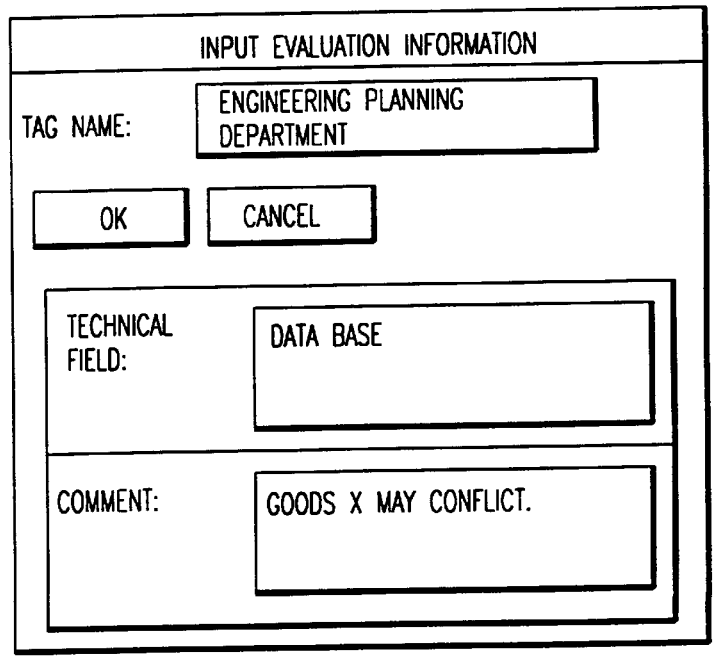

In the example shown in FIG. 8, based on the definition of the tag template shown in FIG. 4, the tag name and the two fields, the technical field and the comment to be inputted by the user, are displayed. The screen as shown in FIG. 8A is displayed, and the user inputs, for example, as shown in FIG. 8B. The "ok" button is clicked thereby the evaluation information is stored in the document evaluation information management section 13.

FIG. 9 is an explanation diagram of another example of the display screen of the evaluation information input tool for inputting the evaluation information. In FIG. 8, only fields to be inputted are displayed, but the display method is not limited to this and various modifications are possible. In FIG. 9A, all fields are displayed and the information can be inputted. In this example, in the field "person in charge," "investigation date," and "evaluation" to which the attribute value default is set, values are set at the initial state of the evaluation information input tool. In the field of "evaluation," on the premise that a memo will be attached to the important document, the value of the attribute value default in "evaluation" is made "important." Also areas to be inputted by the user are shown by thick frames in this example.

Also the evaluation information input tool need not reflect the data structure of the tag template. For example, as shown in FIG. 9B, inputting may be performed using display of a tag. Further, information may be inputted directly to the display of a tag attached to a document as described later.

Figure 10:
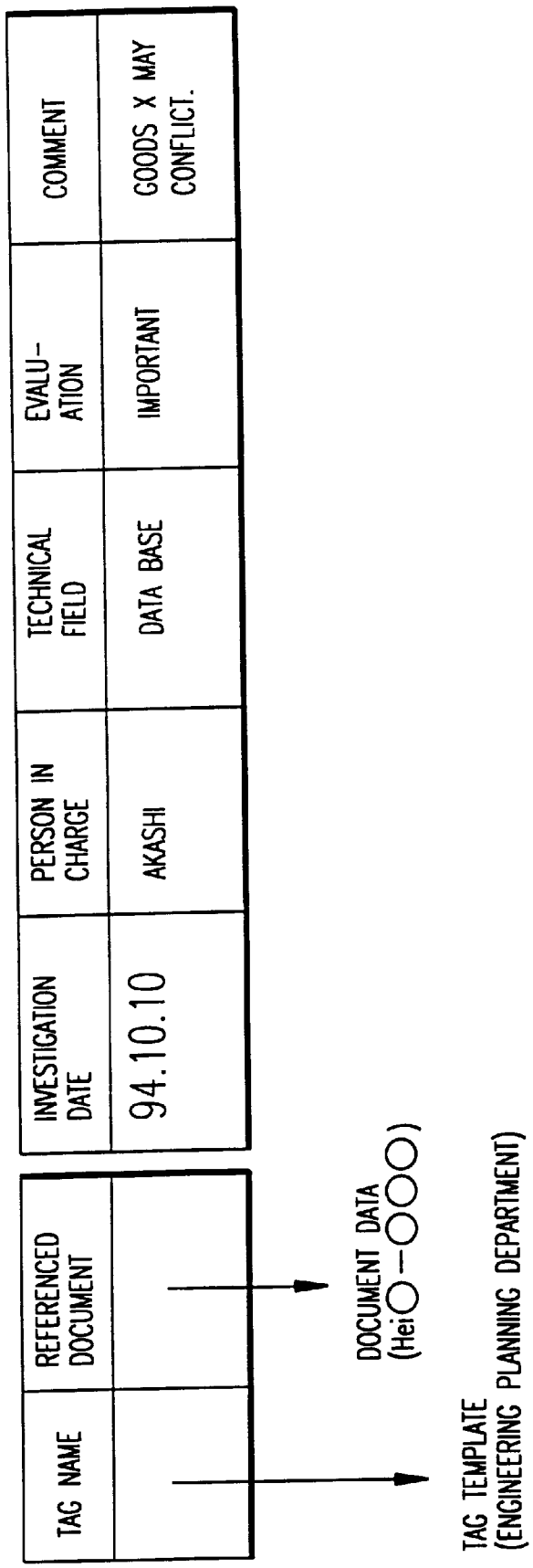
FIG. 10 is an explanation diagram of an example of constitution of data defining comment tag in the first embodiment of the invention.

FIG. 10 is an explanation diagram of an example constitution of the data to define the comment tag in the first embodiment of the document management device of the present invention. As above described, the comment tag does not exist in the form of the independent data structure handled by the management section. The comment tag is virtually generated view or a temporarily created structure where the evaluation information related to the selected document is displayed according to the tag template.

The comment tag shown in FIG. 10 maintains in addition to set of the attribute name and the attribute value held as the evaluation information, relevance to the tag template by the tag name and relevance to the corresponding document. Set of the attribute name and the attribute value is, for example, set of the attribute name "investigation date" and the attribute value "94. 10. 10." The tag name is that attached to the tag template. In this embodiment, the tag name serves also as a relation name updated at update processing of the evaluation information. The referenced document is the name that identifying document held in the document information management section 11. The referenced document name is set as the attribute value corresponding to the attribute "reference number" within the relation by the update processing of the evaluation information.

Of course, using the data structure shown in FIG. 10 actually, the comment tag may be expressed. Or set of pointers to the tag template, the document data and the evaluation information may be constituted. Since the comment tag is displayed in similar manner to memo attaching as described later, information specifying the display form may be defined.

Figure 11:
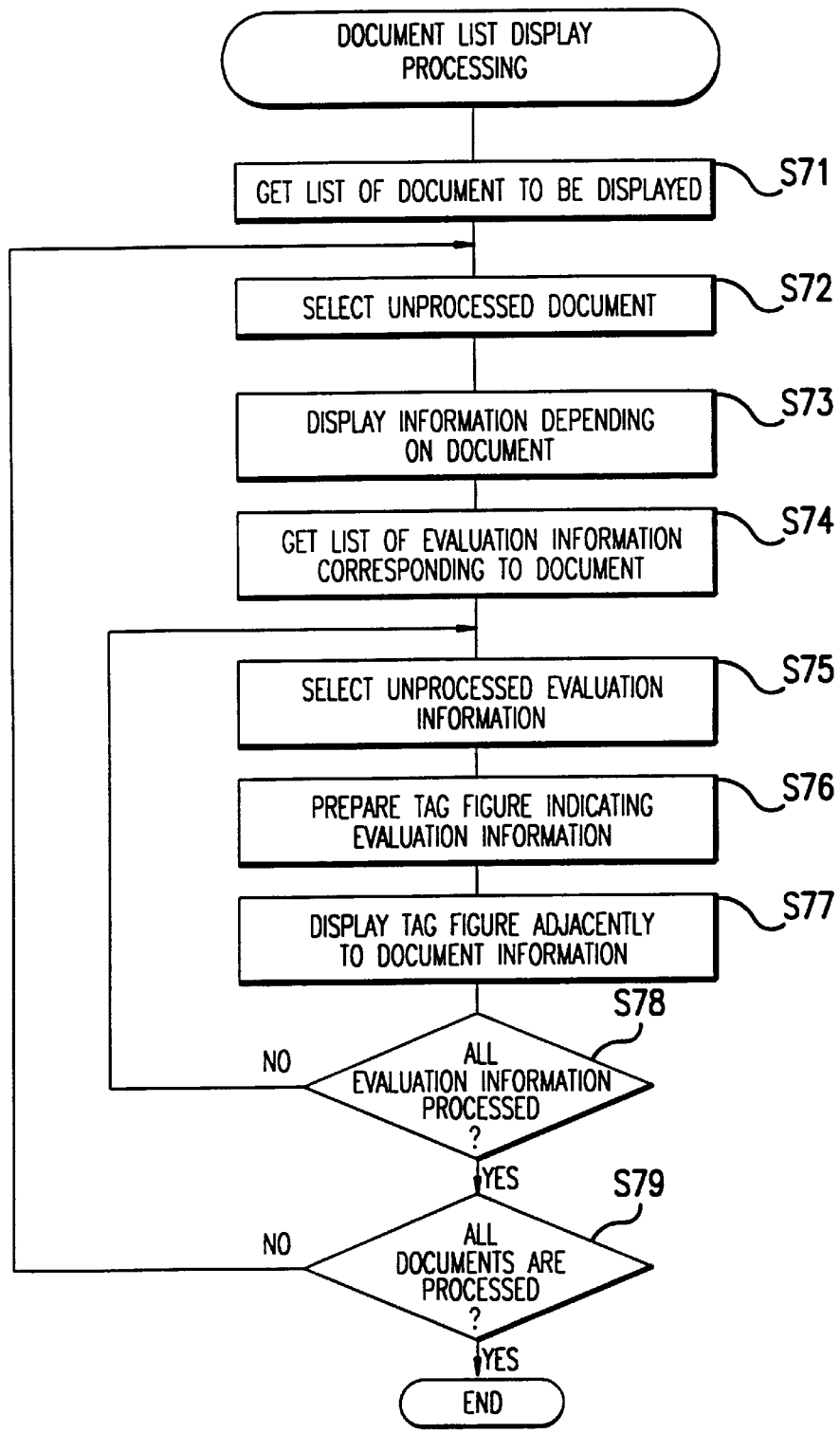
FIG. 11 is a flow chart showing an example of document list display processing in the first embodiment of the invention.

FIG. 11 is a flow chart showing an example of document list display processing in the first embodiment of the document management device of the present invention. First, at S71, the list of the display document from the document information management section 11 is collected. For example, from the reference management relation shown in FIG. 3A, the reference number of the displayed document and the list of dependent information on the document are collected.

At S72, unprocessed document being not displayed is selected. At S73, information dependent on the selected document is displayed. At S74, the list of the evaluation information bound with the document is collected. For example, as shown in FIGS. 3B and 3C, when the evaluation information is registered in t he relation of the database, the list of the evaluation information bound with the selected document is collected from the engineering planning department relation and the intellectual property department relation.

At S75, the unprocessed evaluation information being not displayed is selected. At S76, the tag figure is created from the selected evaluation information and the definition of the tag template associated with the evaluation information. At S77, the created tag figure is displayed adjacent to the corresponding document information.

At S78, decision is effected regarding whether the whole evaluation information bound with the selected document was displayed or not. If the evaluation information being not displayed remains, processing of S75 to S77 is performed repeatedly. At S79, decision is effected regarding whether all documents were processed or not. If the unprocessed document remains, processing of S72 to S78 is performed for the document.

Figure 12:
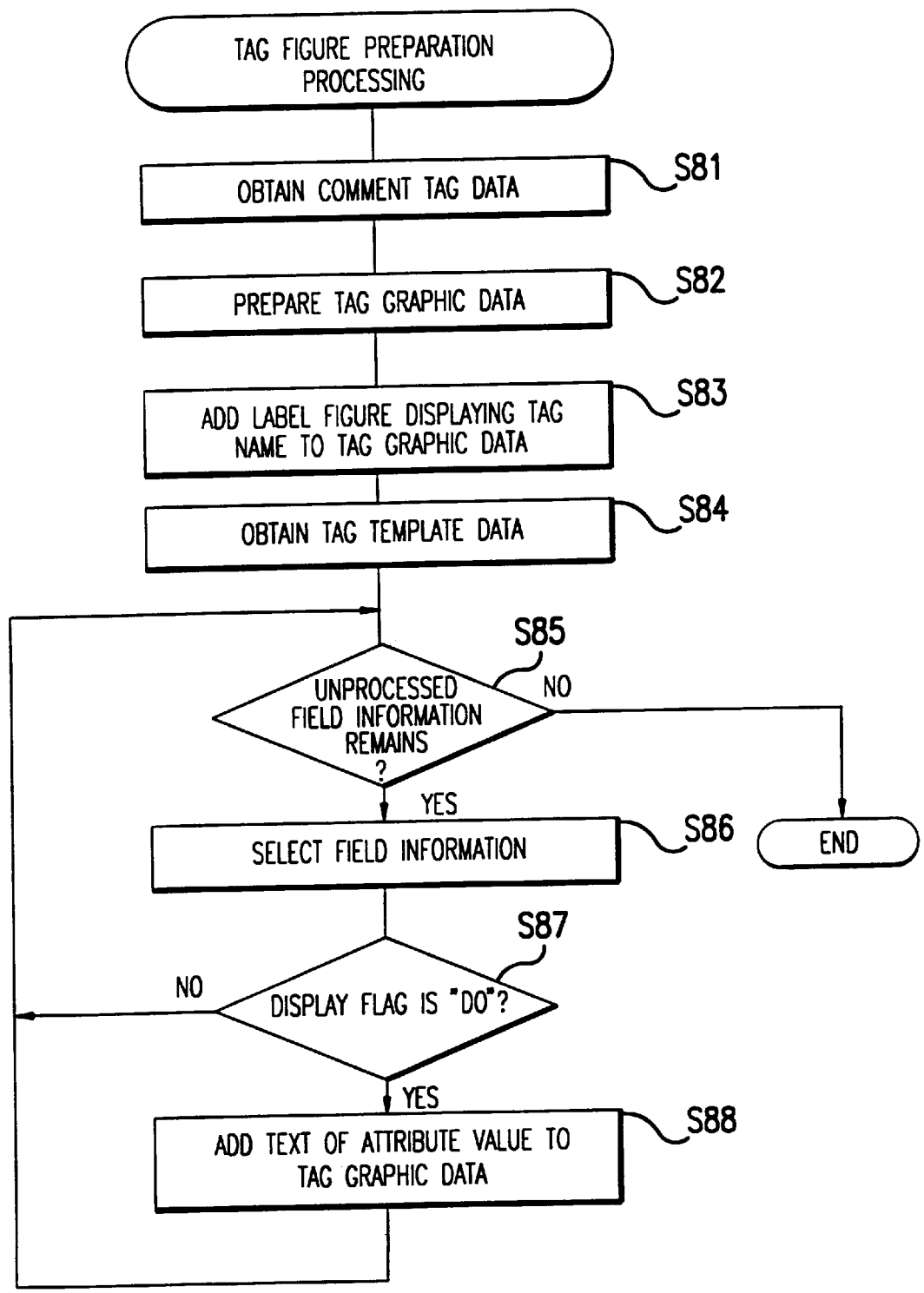
FIG. 12 is a flow chart showing an example of tag figure preparation processing in the first embodiment of the invention.

FIG. 12 is a flow chart showing an example of the creation processing of the tag figure in the first embodiment of the document management device of the present invention. This processing is performed at S76 of FIG. 11. Also when the evaluation information is inputted, the tag figure can be displayed utilizing this processing.

At S81, the comment tag data are obtained. When this processing is executed during process of inputting the evaluation information, data of the comment tag created during the input process are used. When the document information is displayed, the database is retrieved thereby data of the relevant comment tag are obtained. At S82, the data structure holding information to display the tag figure is created and initialized, and at S83, data displaying the label figure to display the tag name are added to the tag graphic data. At S84, the tag template data corresponding to the comment tag are obtained from the tag template management section 12 utilizing the tag name.

At S85, decision is effected regarding whether the unprocessed field information remains or not in the data of the tag template. If the unprocessed field information remains, at S86, the unprocessed field information is selected. At S87, decision is effected regarding the display flag of the field information. If the value of the display flag is "do," at S88 the data to display the text set as the attribute value of the field information are added to the tag graphic data.

When the processing is finished regarding information of all fields of the tag template, the tag figure to be displayed is created. This tag figure is displayed at S77 of FIG. 11.

Figure 13:
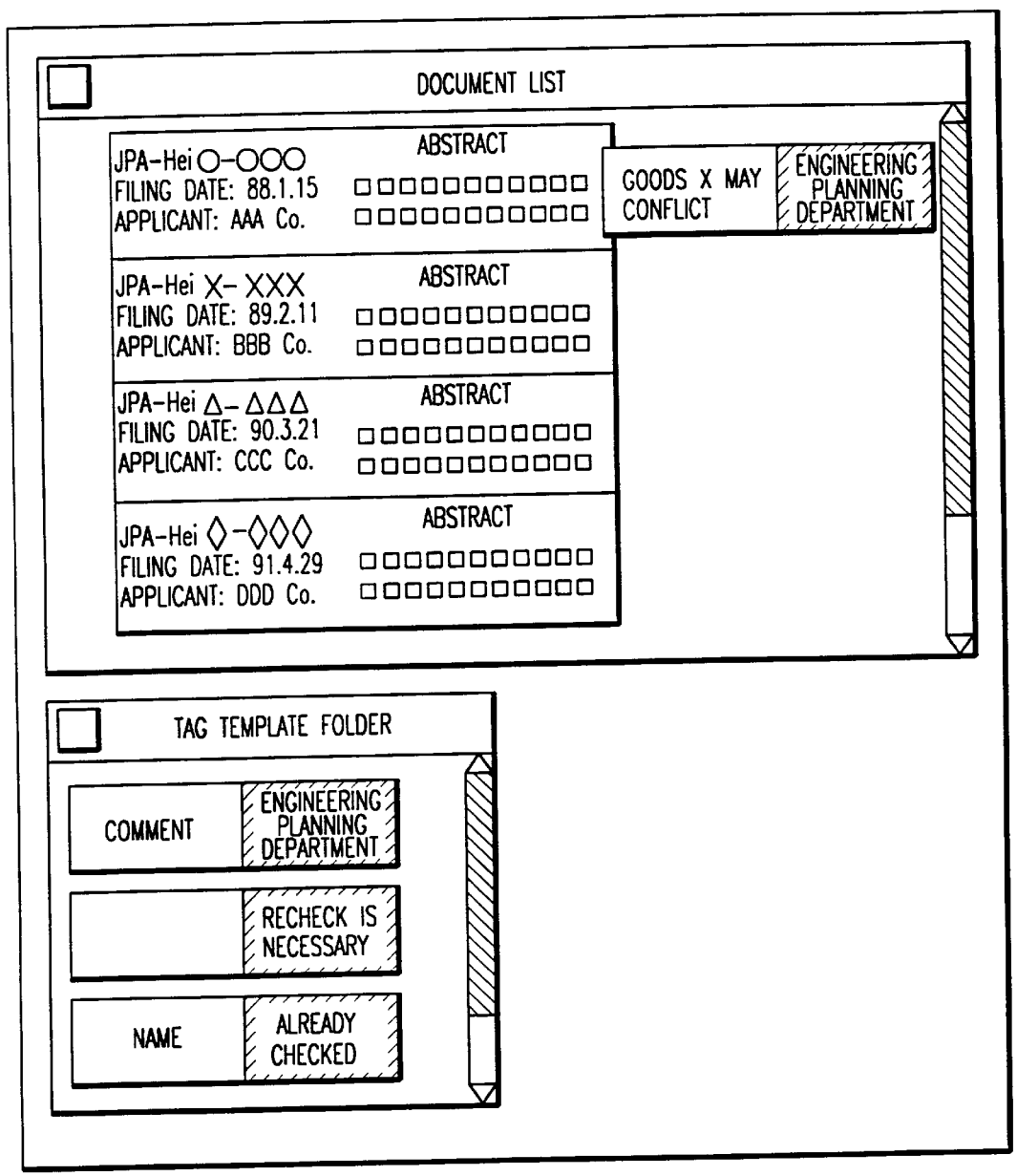
FIG. 13 is an explanation diagram of an example of a displayed document list and a tag template folder.

FIG. 13 is an explanation diagram of an example of the displayed document list and the tag template folder. The document list is displayed by the processing shown in FIG. 11. Here the document list is displayed using the document dependent information managed by the document management relation shown in FIG. 3A as list. The comment tag displaying the evaluation information is displayed at the position of the document with the evaluation information attached. In this example, the evaluation information is attached to one document. Display of this comment tag is created, for example, based on constitution of data as shown in FIG. 10.

Also in the display example shown in FIG. 13, in addition to the document list, the tag template folder is displayed. The tag template folder displays the tag template being necessary information to create the comment tag as figure like a tag. The display by figure like a tag is hereinafter referred to as tag display. In the tag template folder, the tag template creating the following comment tags is tag-displayed.

(1) It is used to indicate the comment by the comment tag for evaluation of the engineering planning department.

(2) It is used only to indicate whether the comment tag indicating necessity of check exists or not.

(3) It is not a comment by the tag comment to indicate that the check is performed, but is used to indicate a name of a person who performs the check.

Besides writing of content, the tag can be utilized in various methods. In any case, since the structure is common, the tag in item (1) will be described in detail as follows.

Figure 14:
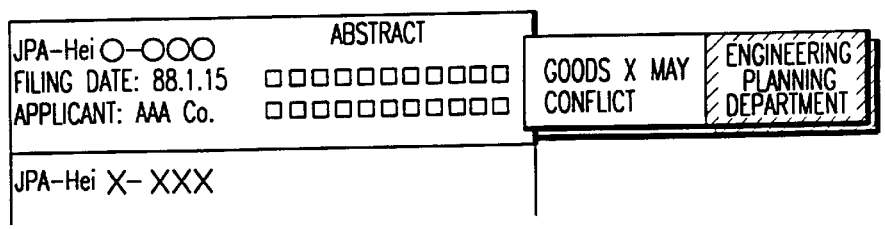
FIG. 14 is an explanation diagram of an example of display of a plurality of tag figures.

FIG. 14 is an explanation diagram of a display example when a plurality of tag figures are displayed. When the tag display is performed as above described, if plural pieces of evaluation information exist for one document data, plural tag figures are displayed. When plural tag figures can be displayed, each tag figure is displayed in arrangement side by side. However, if sufficient display space can not be taken for arrangement side by side, for example, as shown in FIG. 14, the figures may be displayed in overlaying. In this case, by click using a mouse or the like, the tag figure displayed at the lower side may be displayed to the upper side.

Figure 15:
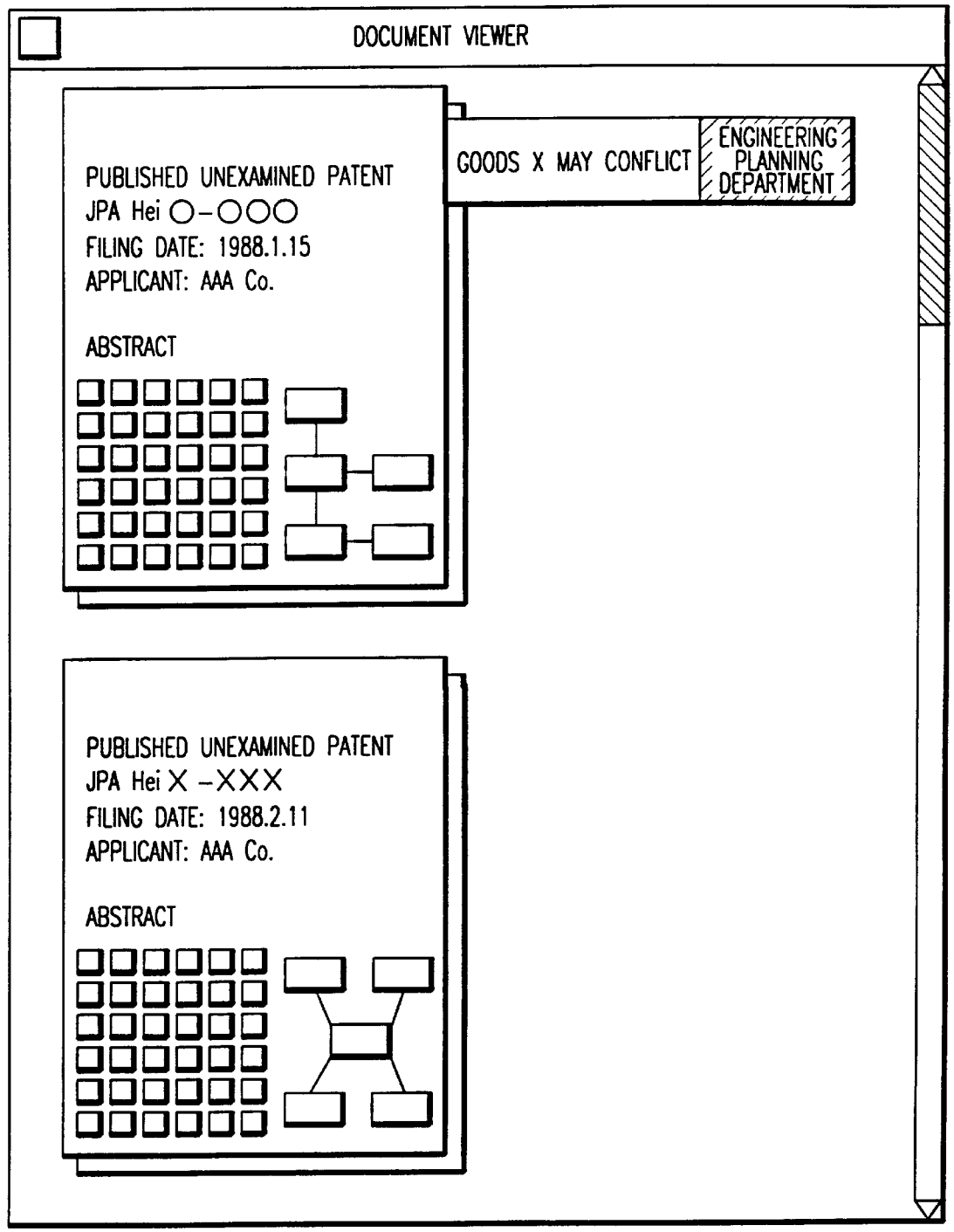
FIG. 15 is an explanation diagram of an example of display of document data.
Figure 16:
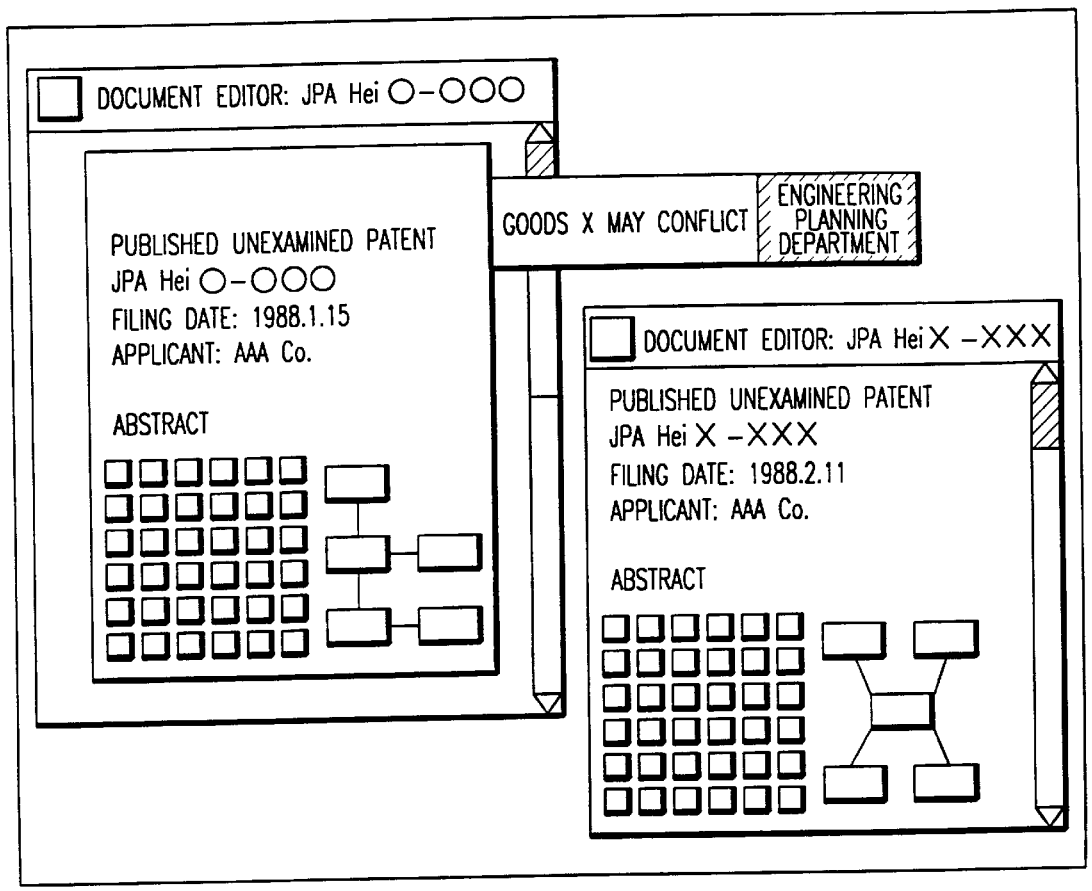
FIG. 16 is an explanation diagram of another example of display of document data.

FIG. 15 and FIG. 16 are explanation diagrams of an example of display of the document data. In the example shown in FIG. 13, the document dependent information accompanying the document data is displayed as a list, and a tag is attached to the list. However, the present invention is not limited to this, for example, as shown in FIG. 15, an image of individual document data is displayed and the tag figure may be attached to the image of the document data. Also in FIG. 15, although the tag is attached only within the document viewer, that is, the window of the tool to display an image of the document data, besides this, for example, as shown in FIG. 16, the standard window system may be extended so that the tag is attached going out of the window.

Figure 17:
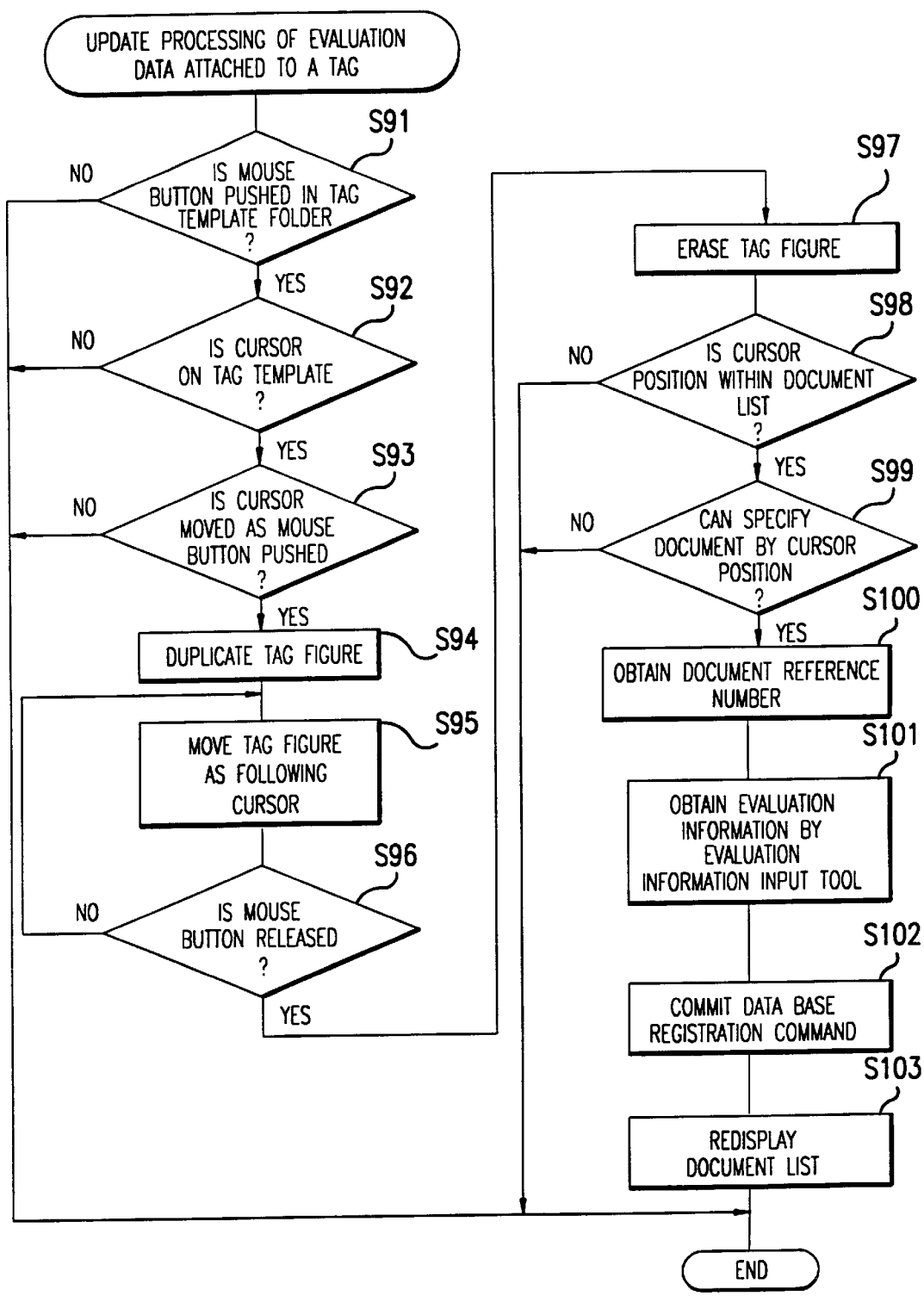
FIG. 17 is a flow chart showing an example of processing of tag attachment and evaluation information update in the first embodiment of the document management device.

Next , a series of flow of operation so as to supply the document data with the evaluation information will be described. FIG. 17 is a flow chart showing an example of the processing of tag attachment and evaluation information update in the first embodiment of the present invention. In the following description, a user uses a mouse as one of the input device. Control of the mouse shall be performed by standard window system.

First, at S91, decision is effected regarding whether the mouse button is pushed or not by the tag template folder. When the mouse button is pushed by the tag template folder, at S92, decision is effected regarding whether the cursor is above the tag template or not. When the cursor exists above the tag template, further at S93, while the mouse button is pushed, decision is effected regarding whether the cursor is moved or not. In such decision, the decision is effected regarding whether the tag template within the tag template folder is dragged or not. If such condition is not satisfied, the control is returned to the window system.

At S94, the figure of the tag template is duplicated, and at S95, the tag figure is moved following the cursor. At S96, decision is effected regarding whether the mouse button is released or not, and as long as the mouse button is continued to be pushed, processing of S95 is continued.

If the mouse is released, at S97, the tag figure is erased, and at S98, decision is effected regarding whether the cursor position is within the document list or not. When the cursor is within the document list, further at S99, decision is effected regarding whether the document can be specified or not by the cursor position. This decision may be effected by inquiring to the tool of the document list. If the condition is not satisfied in decision of S98 and S99, the control is returned to the window system.

When the document can be specified by the cursor position, at S100, the document is specified. At S101, for example, the evaluation information input tool is started and input from the user is received and the evaluation information is obtained. At S102, the command of registering the evaluation information to the database is created, and the command is committed. Thereby the obtained evaluation information is registered to the database. And then, at S103, the document list is redisplayed regarding the specified document. That is, processing corresponding to the document list display processing S73 to S78 as shown in FIG. 11 is performed, and the tag figure representing the newly added evaluation information is displayed.

Figure 18:
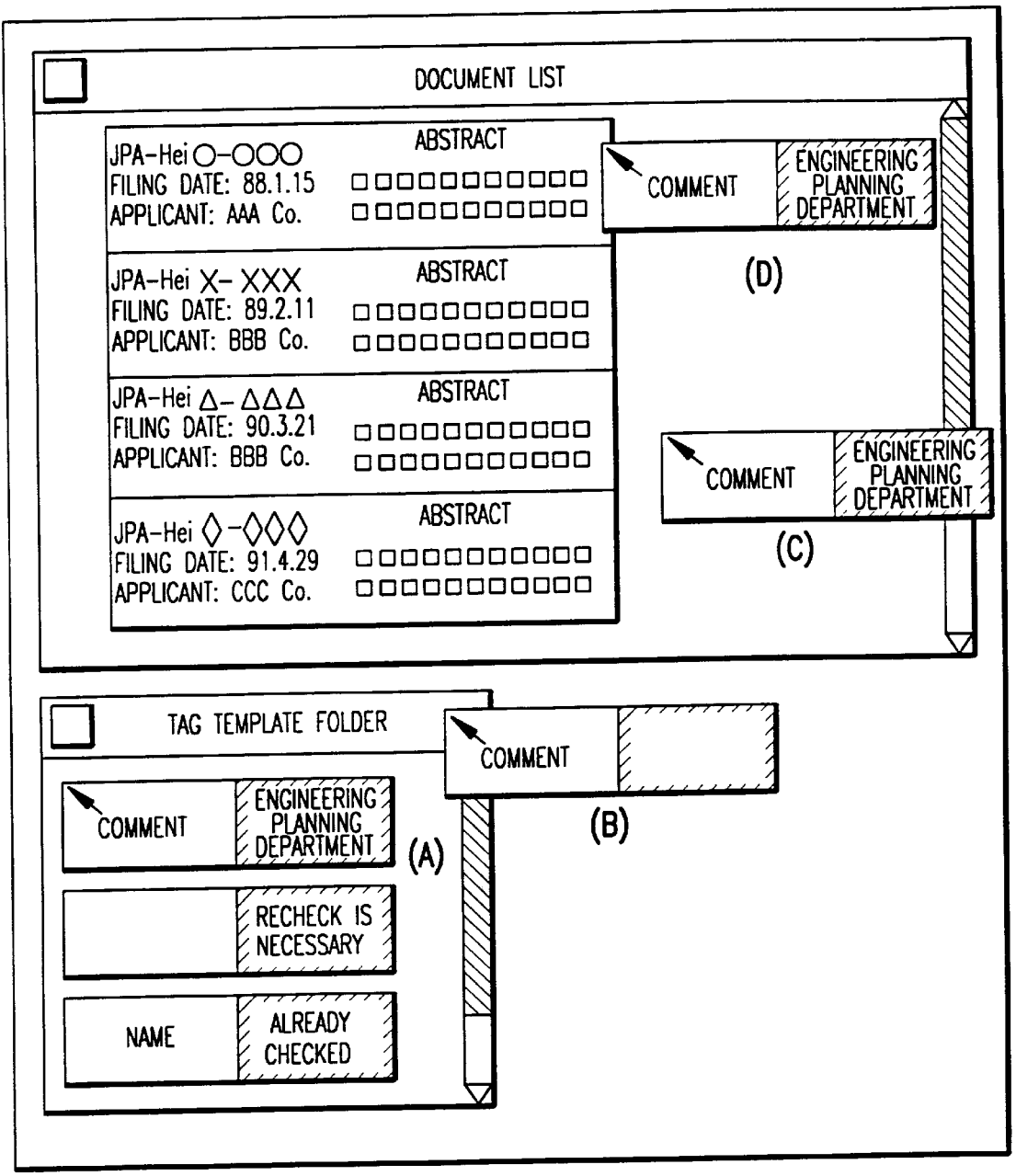
FIG. 18 is an explanation diagram of an example of concrete operation of supplying evaluation information to documents.

FIG. 18 is an explanation diagram of an example of concrete operation of supplying the evaluation information to the document. Here, an example is shown that the comment tag for evaluation of the engineering planning department displayed in the tag template folder is selected and attached to the document.

First, the cursor is moved onto the tag display showing the tag template for evaluation of the engineering planning department within the tag template folder, and the mouse button is pushed. Thereby the tag template of evaluation of the engineering planning department can be selected. This state is shown in FIG. 18A. Here, the frame of the selected tag template is shown in thick line.

Next, while the mouse button is pushed, the cursor position is moved (dragged). Thereby as shown in FIG. 18B, the tag display is duplicated and moved following the cursor. Further, while the mouse button is pushed through (C) to (D), the tag display is dragged within the document list window. The mouse button is released at position of FIG. 18D corresponding to the document as object of the evaluation within the document list.

As a result of the series of operation, the comment tag can be supplied to the first document data shown in the document list of FIG. 18. Subsequently, for example, the evaluation information input tool is started, and the window as shown in FIG. 8A is opened. Therefore, as shown in FIG. 8B for example, input is performed in the area shown by the thick frame thereby necessary attribute is defined. The "ok" button is pushed by the mouse thereby the evaluation information is established and the database is updated. After the update of the database, the display of the document list is updated as shown in FIG. 13.

Here, although the evaluation information input tool is started immediately after the tag attachment operation, the invention is not limited to inputting of the evaluation information at the attaching of the tag. For example, after the tag is attached by the drag-and-drop, the evaluation information input tool may be separately started. Further the evaluation information may be made capable of inputting directly on the tag figure. Also input of the evaluation information need not be after the attachment. The comment tag with the evaluation information inputted is held, and then may be attached.

Processing of registration and update of the evaluation information can be performed, for example, by composing and committing commands provided by the database query languages such as SQL. For example, after the comment tag is attached as shown in FIG. 18, when the evaluation information is inputted using the evaluation information input tool as shown in FIG. 8 and the update is commanded, the command shown as follows may be created and committed.

INSERT INTO engineering planning department (reference number, investigation date, person in charge, technical field, evaluation, comment) VALUES ('JP-A o-ooo,' '94. 10. 10,' 'Akashi,' 'database,' 'important,' 'goods X may conflict')

By this command, the inputted evaluation information is added, for example, to the engineering planning department relation as shown in FIG. 3B. The tag name is used as relation, and the attribute being the reference number is added for the relating to the document.

In the above-mentioned example, although the evaluation information is inputted when the comment tag is attached to the document, and the database is updated immediately after the input finishing, the invention is not limited to this. Several comment tags are attached and the evaluation information is inputted, and then update of the database may be commanded collectively.

Also object of attaching one comment tag is not necessarily one document. One comment tag is attached to collection of documents selected by a user, thereby the evaluation information common to all documents included in the collection may be given. Also the comment tag already attached to some document may be attached also to other document.

As above described, the comment tag can be attached and the evaluation information can be inputted by simple operation. Also the comment tag can be detached in such simple operation that the cursor is fitted to the attached comment tag and the mouse button is pushed and the button is released out of the reference. In this case, the evaluation information may be deleted or may remain as it is.

According to the information management device of the present invention, registration of data for document management of high degree such as the evaluation information can be performed without being conscious of the database only by operation of attaching the tag in similar manner to attaching of the memo.

Figure 19:
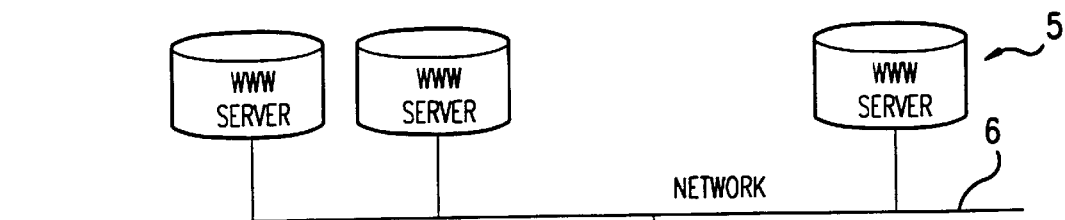
FIG. 19 is an explanation diagram of an example of retrieval result utilizing evaluation information.

Thus the evaluation information with the comment tag attached and being inputted can be stored in the database as above described. Therefore the evaluation information can be utilized with various modifications. FIG. 19 is an explanation diagram of an example of the retrieval result utilizing the evaluation information. For example, as shown in FIG. 3, when the document dependent information and the evaluation information are stored in the database, a database query language, for example, SQL is used, thereby relation shown in FIG. 3 is coupled and the retrieval result as shown in FIG. 19 can be obtained. In this example, regarding the reference where the evaluation in the engineering planning department is "important," in addition to the information accompanying the reference, the comment in the engineering planning department and the corresponding information in the intellectual property department are shown in a table.

For example, the retrieval result can be obtained by issuing the following retrieval commands. In this embodiment the retrieval condition receiving section receives the retrieval condition inputted by the user, then issues the retrieval command to the document information retrieve section. Suitable items are written in a table or a card and the prior art creating the retrieval command is used, thereby such retrieval command need not be inputted directly by the user.

SELECT reference number, filing date, applicant, technical field, engineering planning department.comment, intellectual property department.action FROM reference management, engineering planning department, intellectual property department WHERE evaluation of engineering planning department= "important"

In this query, as dependent information peculiar to the document, the reference number and the applicant belonging to the document management relation are used. As the evaluation information for the document, 'technical field,' 'comment,' and 'evaluation' belonging to the engineering planning department relation and 'action' belonging to the intellectual property department relation are used.

The document information retrieve section retrieves the document information which satisfies the document retrieval condition. This processing includes two steps. First, the document evaluation information which matches the retrieval condition are retrieved from the document evaluation information management section 13. Then, the document information bound to the retrieved document evaluation information is retrieved. Because, in this example, the retrieval condition includes the condition for the dependent information peculiar to the document, the document information also satisfy this condition.

In this example, the retrieval condition is defined by using only an attribute of relation of the engineering planning department corresponding to one evaluation viewpoint though, more complicated conditions may be defined by combining with attributes of the other evaluation viewpoints such as relation of the intellectual property department, or combining with attributes of relation of the document management corresponding to document dependent information peculiar to the document, In any case, as a result of attaching the comment tag as the evaluation for the document, utilizing the structure of such comment tag and the input data to the comment tag, the evaluated documents can be put in order from the own viewpoint.

Of course, the utilization method of the evaluation information stored in the database is the retrieval of the database, the creation of the table as a result of this or the like. Creation program of a table of higher degree or creation program of various sorts of graphs or charts may be utilized.

Thus the evaluation information is handled as the independent information of the document data thereby the evaluation information can be utilized effectively. In the above description, although the evaluation information has been used, the invention is not limited to this but various pieces of information, for example, the work command, can be attached as the tag to the document data and can be utilized.

Next, a second embodiment of a document management device of the present invention will be described. In the first embodiment as above described, an example is shown where evaluation information is attached to document data internally prepared by a user.

According to the second embodiment, however, evaluation information can be attached to document data managed by an external document database which can be accessed through a network.

In the second embodiment, a document management device has function that document data stored in a WWW (World Wide Web) server are referred to, and a comment tag is attached to document data referred to by a user.

Figure 20:
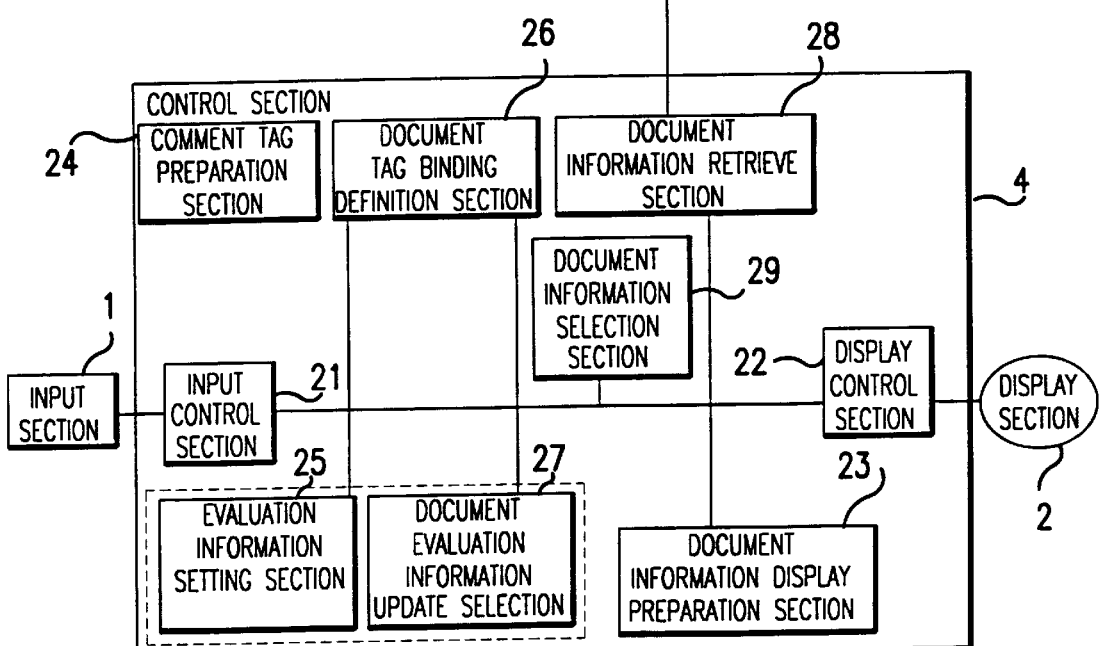
FIG. 20 is a block constitution diagram showing an example of a document processing device to which a second embodiment of a document management device of the invention is applied.

FIG. 20 is a block configuration diagram showing an example of a document processing device to which the second embodiment of the document management device of the present invention is applied. In FIG. 20, parts similar to those in FIG. 1 are designated by the same reference numerals, and the description shall be omitted. Numeral 5 designates a WWW server and numeral 6 designates a network. In this embodiment, the storage section 3 does not have the document information management section 11, and includes the tag template management section 12 and the document evaluation information management section 13. Document information is stored in the WWW servers 5 connected by a network 6.

The document information retrieving section 28 obtains document data from the WWW servers 5 connected by the network 6 according to URL (Universal Resource Locator) commanded by the user.

Figure 21:
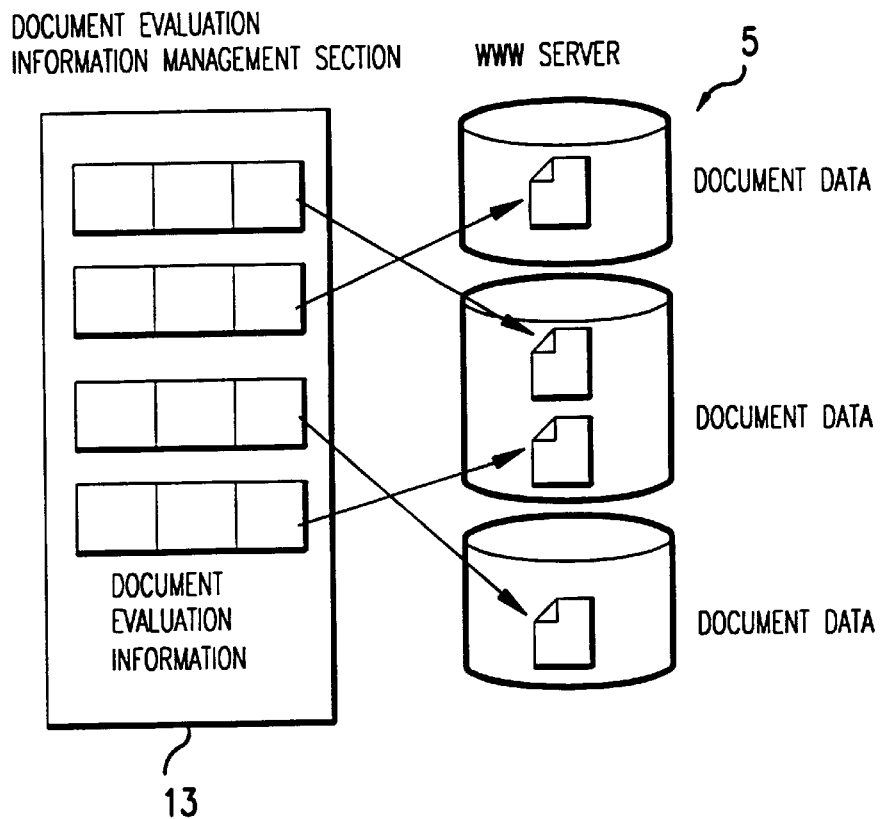
FIG. 21 is a concept diagram showing relation of information managed in a document evaluation information management section and document data stored in WWW server.

FIG. 21 is a concept diagram showing relation of information managed in the document evaluation information management section 13 and document data stored in the WWW servers 5. In the second embodiment, object with document evaluation information attached thereto is various sorts of document data stored in the plural WWW servers 5. These data are, for example, reference information, patent information, or an article in a newspaper. Document evaluation information managed by the document evaluation information management section 13 includes information indicating object to which the document evaluation information is attached.

Figure 22:
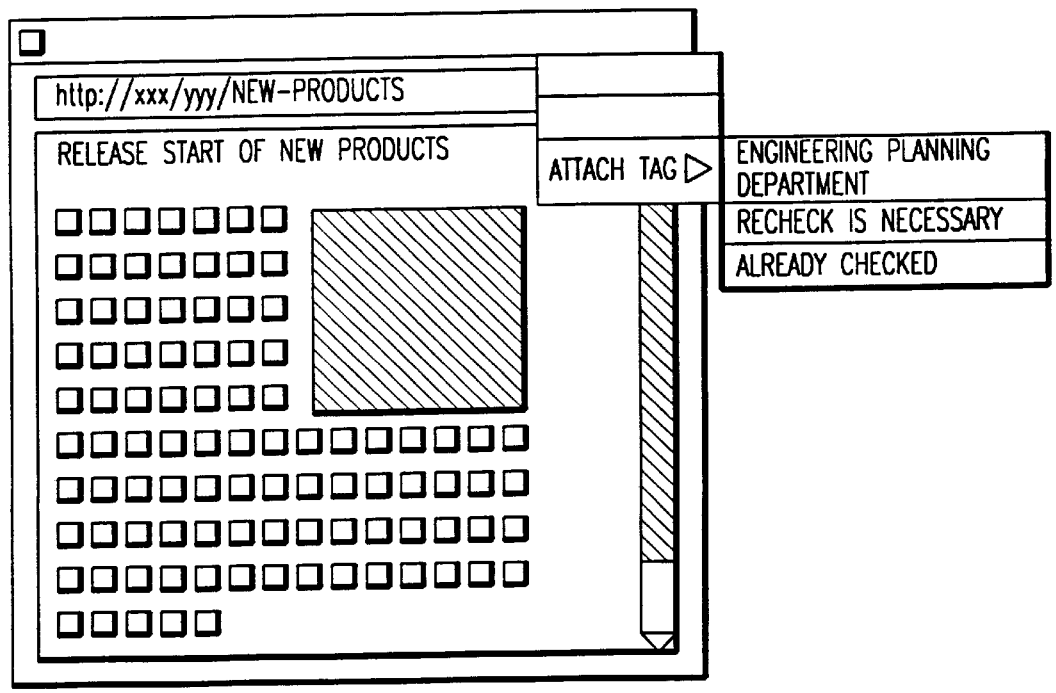
FIG. 22 is an explanation diagram of an example of display of document information and tag template.
Figure 23:
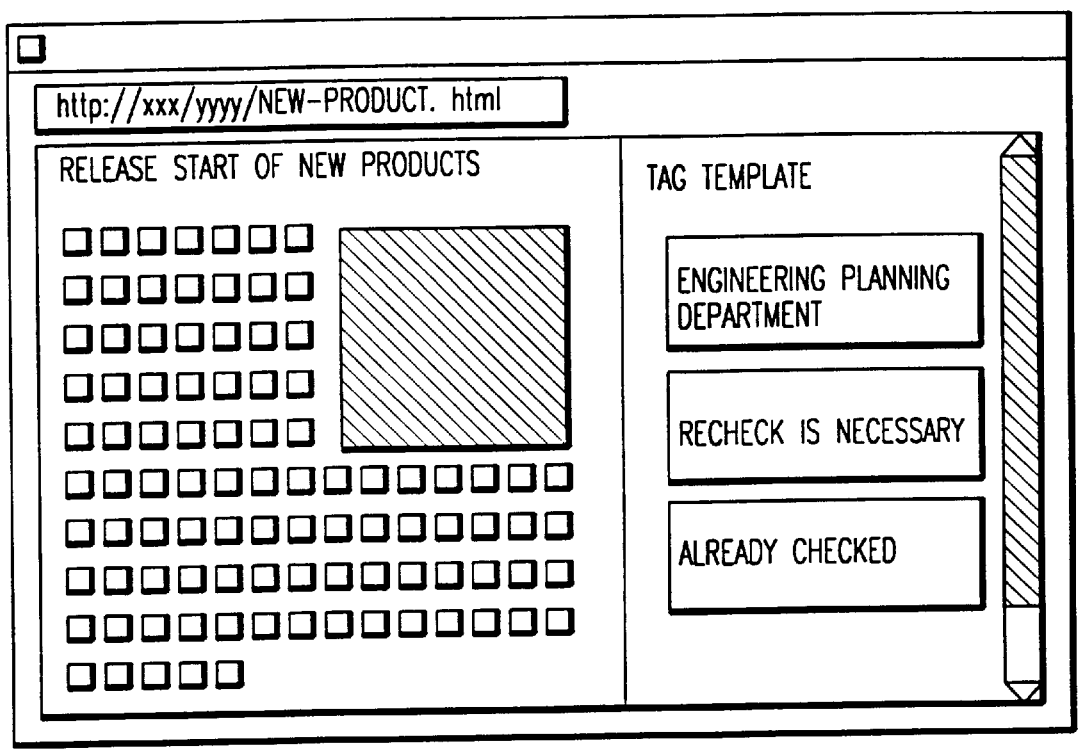
FIG. 23 is an explanation diagram of another example of display of document information and tag template.
Figure 24:
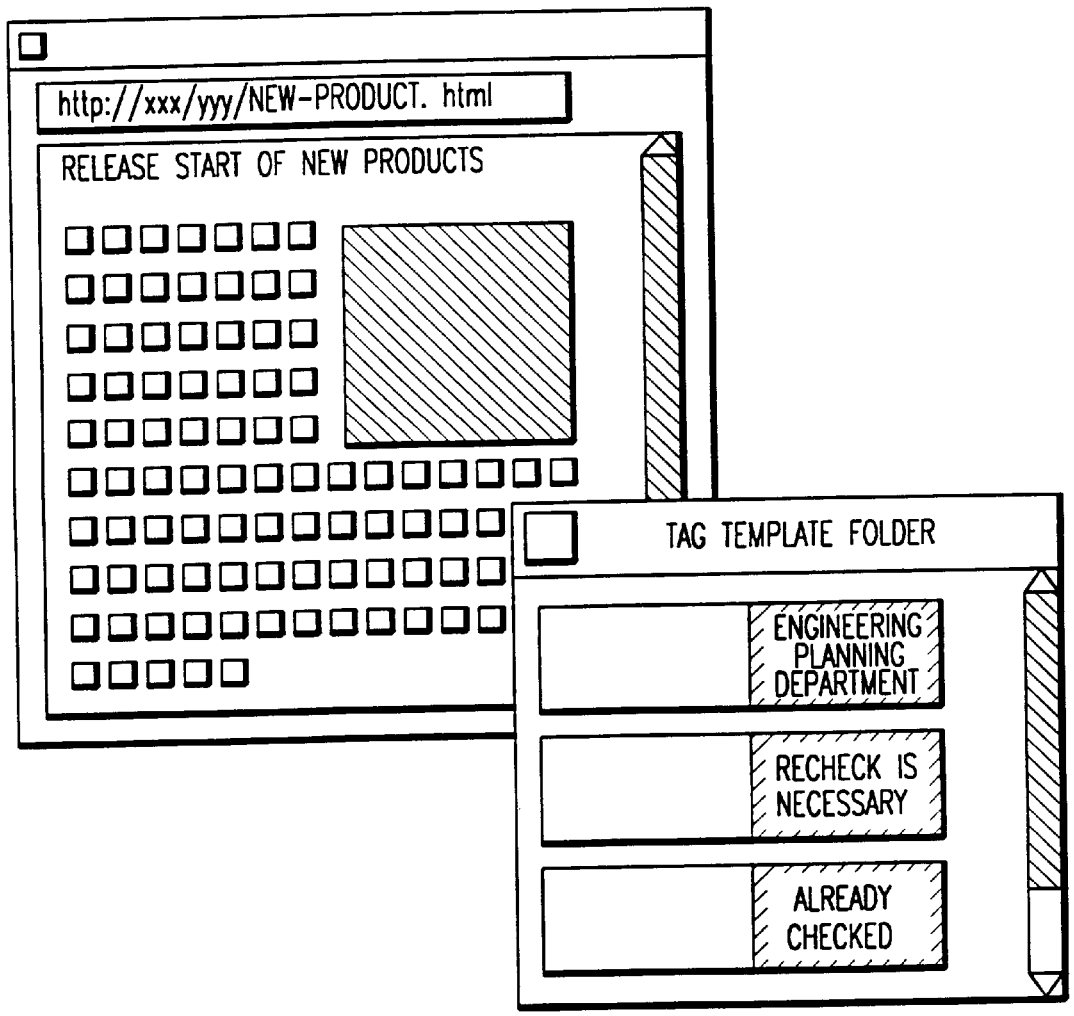
FIG. 24 is an explanation diagram of still another example of display of document information and tag template.

FIG. 22 to FIG. 24 are explanation diagrams of an example of display of document information and a tag template. FIG. 22 to FIG. 24 show state that the comment tag is attached to the document referred to by the user at present. In the document information display window, the document data obtained from the WWW server are displayed based on the URL "http://xxx/yyy/new-product.html" commanded by the user.

Processing of creating the document information display window is similar to that in the existing WWW client such as Mosaic. First, if the user inputs the URL, the document information retrieving section 28 analyzes the URL and specifies the WWW server 5 to be connected, and obtains the document data by connection to the WWW server 5. Next, the document information display preparation section 23 creates the display information based on the obtained document data and the display control section 22 creates the document information display window and displays the display information in the window.

In the example of display shown in FIG. 22, an item "attach tag" is prepared in the menu of the document information display window, and the user selects this item from the menu thereby the comment tag is attached. As shown in FIG. 22, if the user selects the item "attach tag," the menu to display the table of names of the tag template pops up. Further if the tag template to be attached is selected, in similar manner to the first embodiment, the evaluation information input tool as shown in FIG. 8 is started, and the user writes the necessary item thereby the comment tag is attached. The list menu of the tag template can be created by obtaining the name of the tag template from the tag template management section 12.

In the example of display shown in FIG. 23, the list of the tag template is displayed by a button. The user selects a button to display the name of the tag template, thereby sort of the comment tag to be attached is determined. The button representing the tag template may be made always display within the document information display window, or may be made display only while the user performs the attaching operation of the comment tag.

In the example of display shown in FIG. 24, in similar manner to the first embodiment, the list of the tag template is displayed by the figure representing the tag and the tag template folder to involve it. The user selects the template of the specific comment tag on the tag template folder in similar manner to the first embodiment, and performs drag-and-drop on the document information display window thereby attaches the comment tag. In place of the drag-and-drop of the tag template to the document information display window, after the tag template is selected on the tag template folder, the comment tag may be attached by a command using the menu item or the button.

Figure 25:
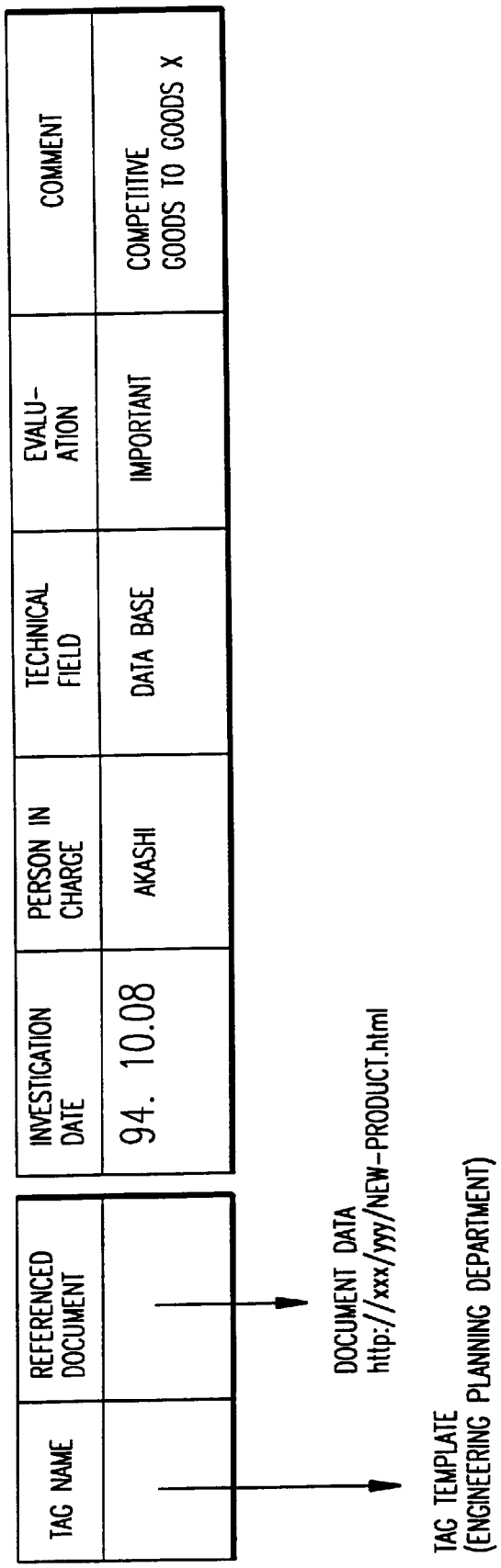
FIG. 25 is an explanation diagram of an example of constitution of data defining comment tag in the second embodiment of the document management device of the invention.

FIG. 25 is an explanation diagram of an example of constitution of the data defining the comment tag in the second embodiment of the document management device of the present invention. Being different from the first embodiment shown in FIG. 10, the URL is stored in the field of the referenced document. Thereby the document data as object of attaching the evaluation information is specified.

FIG. 26 is an explanation diagram of another exemplification of the relation describing the document dependent information and the document evaluation information. Also in the second embodiment, in similar manner to the first embodiment as above described, content of the comment tag can be managed as relation in the document evaluation information management section 13. In the relation shown in FIG. 26, differing from the exemplification shown in FIG. 3, content of each comment tag is related in the reference URL.

FIG. 27 is an explanation diagram of still another exemplification of the relation describing the document dependent information and the document evaluation information. In the example shown in FIG. 27, the relation using the reference number shown in FIG. 3 and the relation by the reference URL shown in FIG. 26 are unified, and the evaluation information for different sorts of documents may be handled under an unified management.

Figure 28:
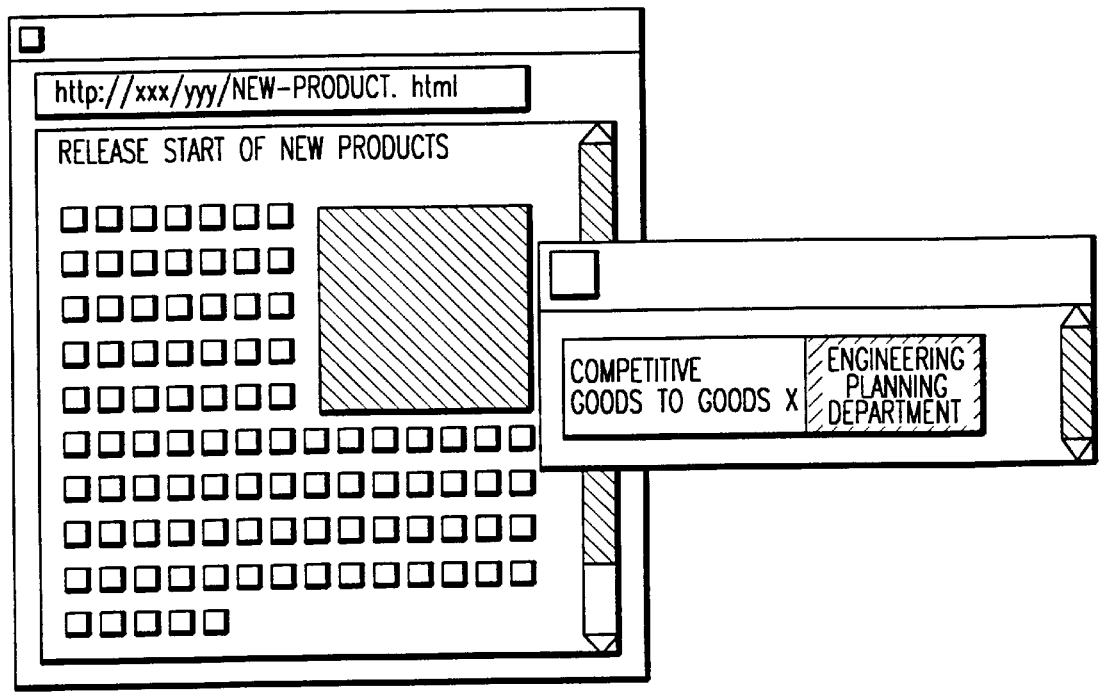
FIG. 28 is an explanation diagram of an example of display of document information and comment tag.
Figure 29:
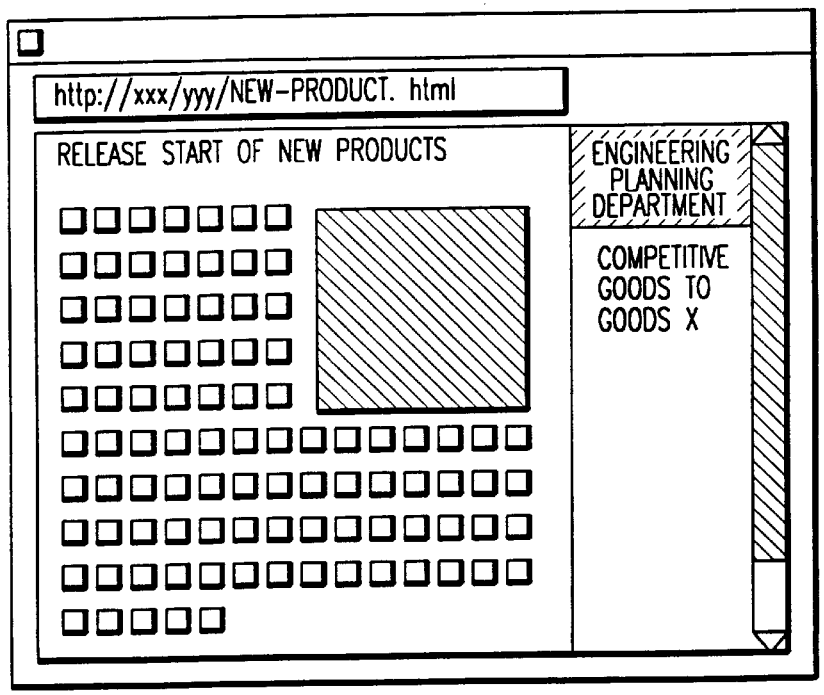
FIG. 29 is an explanation diagram of another example of display of document information and comment tag.

FIG. 28 and FIG. 29 are explanation diagrams of an example of display of the reference information and the comment tag. In the example of display shown in FIG. 28, the document information display window and the evaluation information window displaying the comment tag attached to the document data are displayed. The document information display window and the evaluation information window are interlocked with each other, and if the document data displayed in the document information display window are changed, the comment tag bound with the changed document data is displayed in the evaluation information window. If plural comment tags are bound with the document data, the plural comment tags may be displayed in arrangement side by side within the evaluation information window, or the plural comment tags may be displayed in overlaying as shown in FIG. 14 of the first embodiment as above described. Also FIG. 29 shows the example that the comment tag is displayed with the associated document data within the same window.

Examples have been shown that the comment tag is attached thereby the evaluation information is related to the document. However, information capable of being related to the document is not limited to the information regarding evaluation. In an example shown next, the comment tag is attached thereby the document and the information regarding buying of fixtures in each department are related. In this example, document data with tag "engineering planning department" attached thereto already are attached by the tag "buying of fixtures" indicating that products introduced in the document are to be bought as fixtures.

Figures 30, 31:
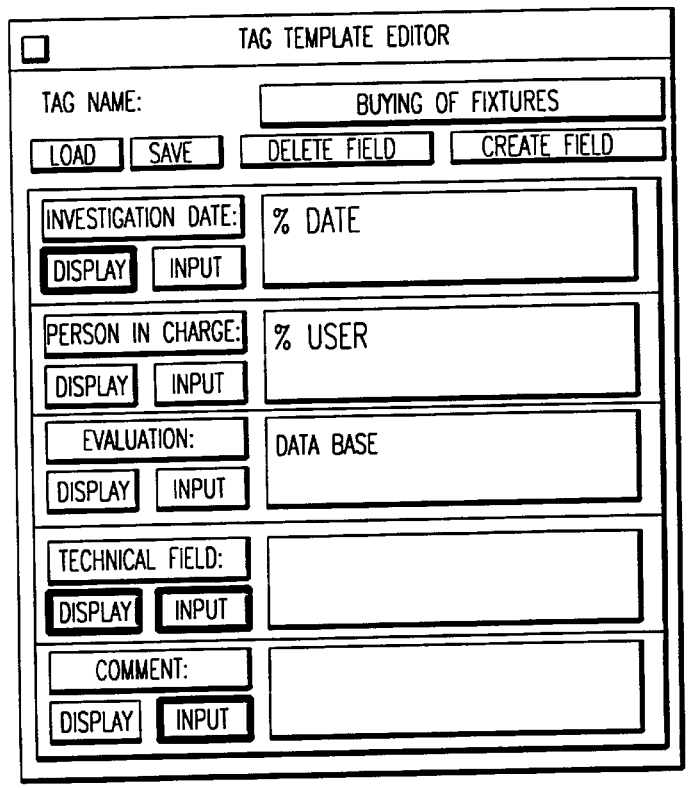
FIG. 30 is an explanation diagram of another example of a display screen of a tool defining tag template.
FIG. 31 is an explanation diagram of an exemplification of expressing information regarding buying of fixtures as relation.

FIG. 30 is an explanation diagram of another example of the display screen of the tool of defining the tag template. In the example shown in FIG. 30, the tag template for "buying of fixtures" is created by the tag template editor in the first embodiment as shown in FIG. 6. In the tag template for "buying of fixtures," each field information of "request date," "person in charge," "sort," "supply section," and "comment" is defined. When the tag is provided, a providing person writes columns of the supply section and the comment. When the tag is attached, the request data and the supply section are displayed within the comment tag.

The tag template defined as shown in FIG. 30 is stored in the tag template management section 12. When fixtures are to be bought, the tag is provided using this tag template. FIG. 31 is an explanation diagram of an exemplification when information regarding buying of fixtures is expressed as relation. Here, two comment tags are provided for separate document data respectively. For example, in the data of the first comment tag, the tag of "buying of fixtures" is attached for the document data obtained from the WWW server based on the URL "http://xxx/yyy/new-product.html" as above described.

Figure 32:
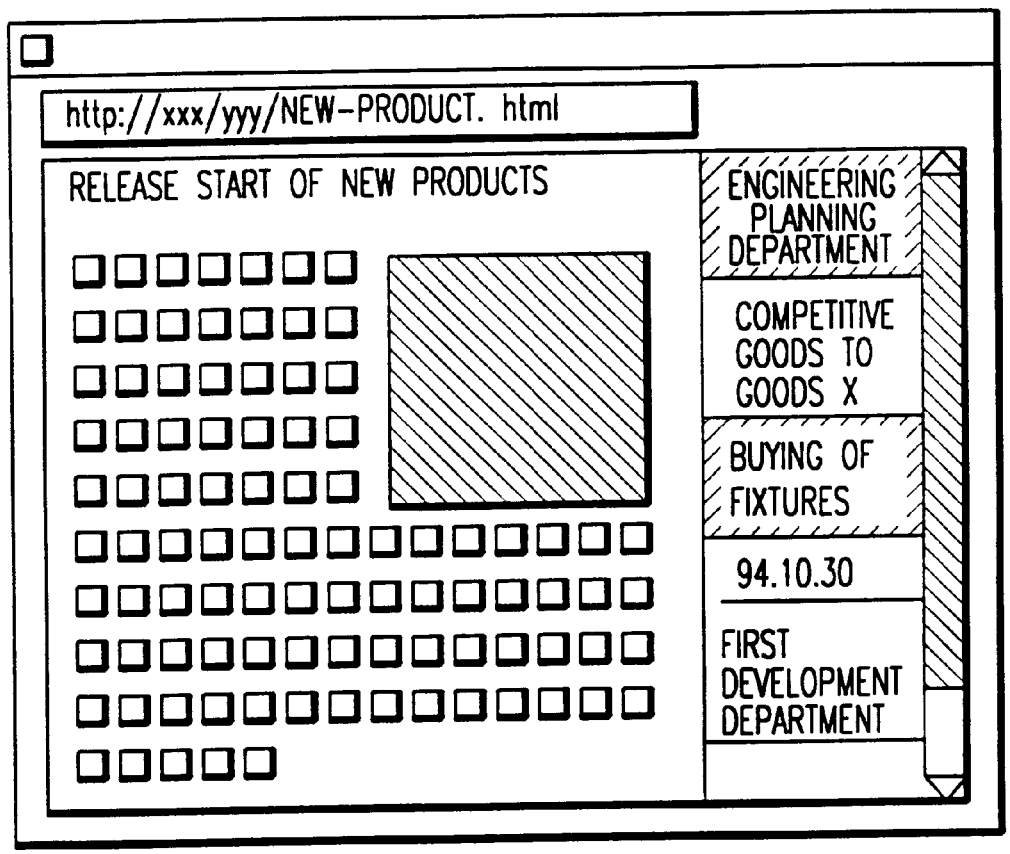
FIG. 32 is an explanation diagram of still another example of display of document information and comment tag.

FIG. 32 is an explanation diagram of still another example of display of the document information and the comment tag. In the example shown in FIG. 32, in addition of display of the document data and the tag of "engineering planning department," further tag of "buying of fixtures" is displayed. The tag "buying of fixtures" may be stored as data as shown in FIG. 31 in the document evaluation information management section 13. When the user sees the document data, the tag "engineering planning department" and the tag "buying of fixtures" are displayed simultaneously, thereby the user can now that products commented "competitive goods to goods X" are to be bought as fixtures by the first development department.

In another example, the comment tag is attached thereby the document and the information regarding schedule of the user are related. In the following example, the tag "engineering planning department" is already attached to the document data, and the user attaches the tag "schedule" describing schedule of business activity relating to the information described in the document to the document data.

Figures 33, 34:
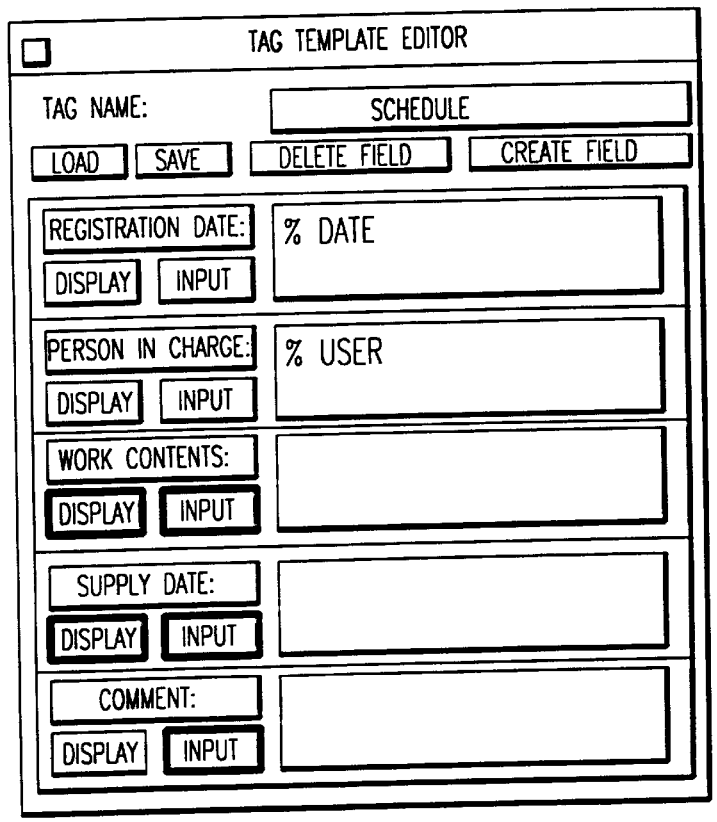
FIG. 33 is an explanation diagram of still another example of a display screen of a tool defining tag template.
FIG. 34 is an explanation diagram of an exemplification of expressing information regarding schedule as relation.

FIG. 33 is an explanation diagram of still another example of the display screen of the tool defining the tag template. In this example, the template of the tag "schedule" is created. The tag "schedule" has information of fields "registration date," "person in charge," "work content," "supply date" and "comment." A person providing the tag inputs "work content," "supply date" and "comment." The fields "work content" and "supply date" are displayed within the comment tag.

The tag template of the tag "schedule" defined as shown in FIG. 33 is stored in the tag template management section 12. The tag regarding schedule is provided using this tag template. FIG. 34 is an explanation diagram of an exemplification when the information regarding schedule is expressed as relation. Also in this example, two comment tags are provided for separate document data respectively. For example, in the data of the first comment tag, the tag "schedule" is attached for the document data obtained from the WWW server based on the URL "http://xxx/yyy/new-product.html" as above described.

Figures 35, 36:
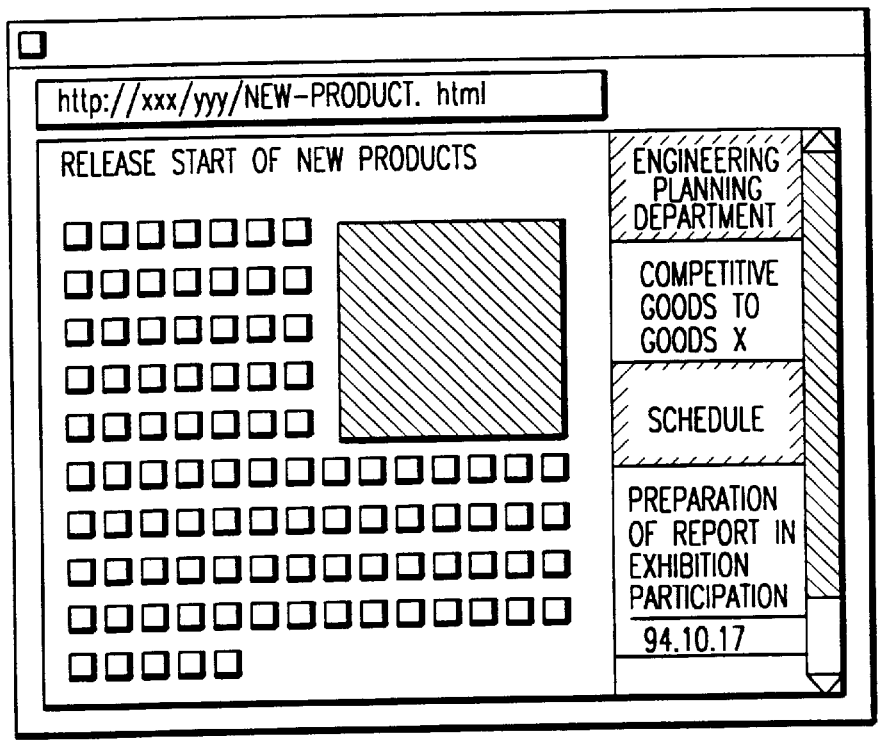
FIG. 35 is an explanation diagram of still another example of display of document information and comment tag.
FIG. 36 is an explanation diagram of an example of HTML document.

FIG. 35 is an explanation diagram of still another example of the display of the document information and the comment tag. In FIG. 35, the document data and the tag "engineering planning department" and the tag "schedule" provided for the document data are displayed. When the user sees the document data, the tag "engineering planning department" and the tag "schedule" are displayed simultaneously, thereby the user can confirm that regarding products commented as "competitive goods to goods X" by the engineering planning department there is schedule of participating in the exhibition and preparing report.

Also the information about buying of fixtures or schedule as above described can be managed and provided as the comment tag and further displayed in similar manner to the information about evaluation.

In general, among document data managed in the WWW server, in the document described in HTML (HyperText Markup Language), hyperlinks referencing other document can be embedded. FIG. 36 is an explanation diagram of an example of the HTML document. Content of the HTML document shown in FIG. 36 here shall be content of the HTML document shown by the URL "http://xxx/yyy/new-product.html." This document includes the description "<a href="http://xxx/yyy/new-product.html"> release start of new products </a>" as hyperlink referring to the HTML document shown by the URL "http://xxx/yyy/new-product.html." Here the description "<a href...>" or "</a>" is usually called "tag," but in this specification, these are called HTML tag for distinguishing from the comment tag.

Figure 37:
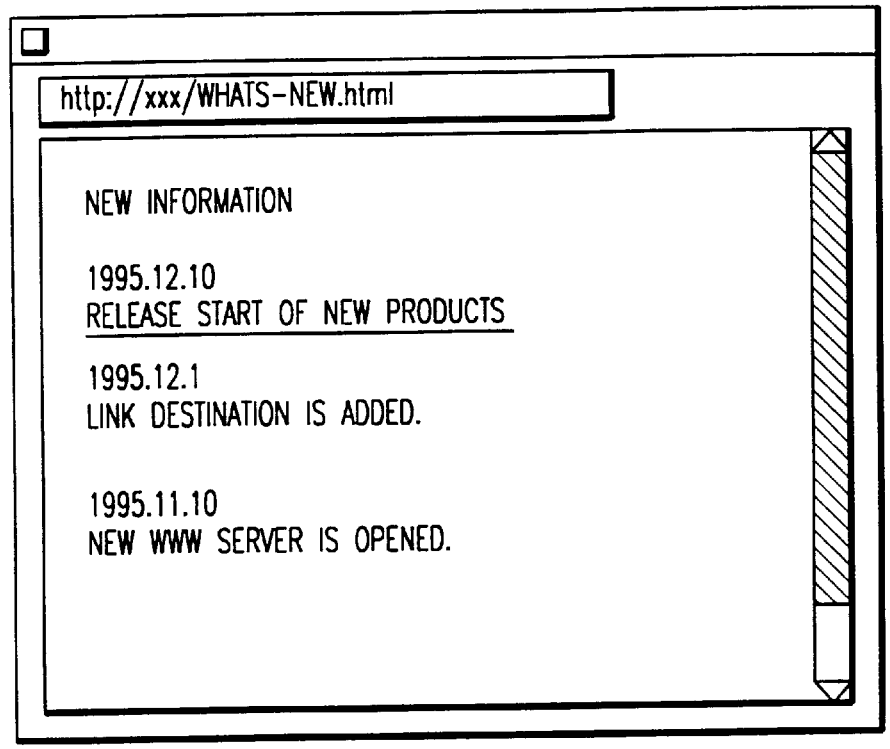
FIG. 37 is an explanation diagram of an example that the HTML document shown in FIG. 36 is displayed in a document information display window.

FIG. 37 is an explanation diagram of an example of display that the HTML document shown in FIG. 36 is displayed to the document information display window. On the document information display window, hyperlink referring to the HTML document shown by the URL "http://xxx/yyy/new-product.html" is displayed as anchor shown by a string "release start of new products." In this example, the string indicating the anchor is underlined thereby it is distinguished from strings being not anchor.

The existing WWW client has such function that a user assigns anchor by a device such as a mouse thereby the document data are obtained and displayed from the WWW server based on the URL held by the hyperlink indicated as an anchor. For example, when the anchor "release start of new products" is clicked by the mouse on the document information display window shown in FIG. 37, as shown in FIG. 22 to FIG. 24, the document data shown by the URL "http://xxx/yyy/new-product.html" are displayed to the document information display window.

In the second embodiment, since the evaluation information holds the URL referencing the document data, when the display processing of the HTML document is performed, if the hyperlink is included in the document, the evaluation information associated with the URL held by the hyperlink is retrieved thereby it can be known whether the comment tag is attached or not to the document referred to by the hyperlink.

Figure 38:
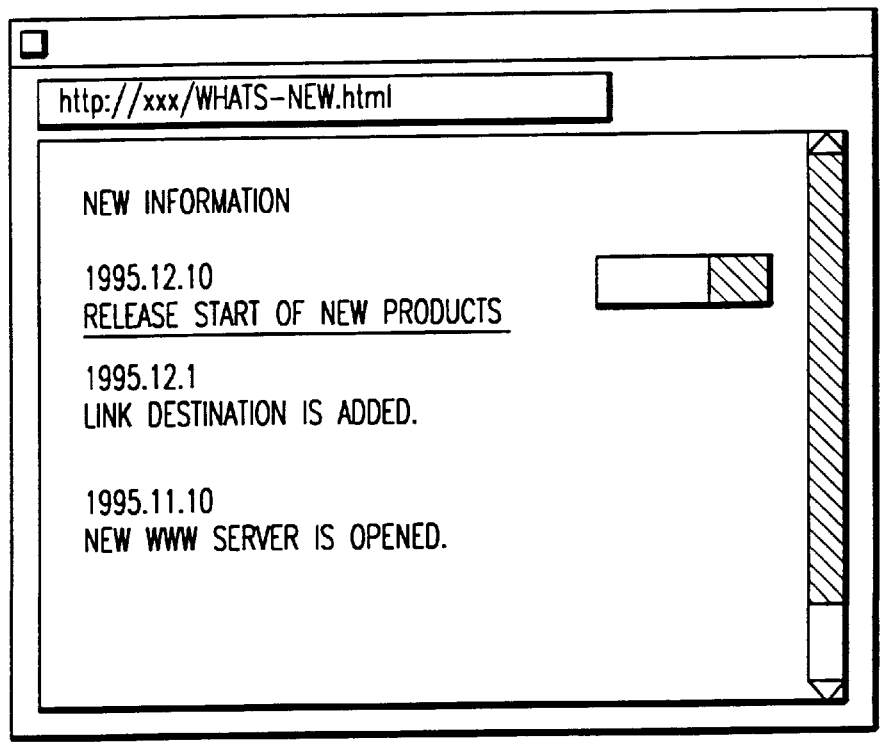
FIG. 38 is an explanation diagram of an example of display that comment tag is attached to document referred to by hyperlink.

FIG. 38 is an explanation diagram of an example of the display when the comment tag is attached to the document referred to by the hyperlink. When the comment tag is attached to the document referred to by the hyperlink, for example, as shown in FIG. 38, the anchor representing the hyperlink may be displayed by providing a mark representing that the comment tag is attached. In FIG. 38, in order to distinguish the anchor with the comment tag attached to the corresponding document data from the anchor with the comment tag not attached, the mark indicating the comment tag attached is displayed adjacent to the anchor with the comment tag attached to the corresponding document data. Besides this, the distinguishing may be performed using various display methods such as variation of font of anchor, color, thickness of line, or enclosing of anchor by frame or flashing of anchor.

Figure 39:
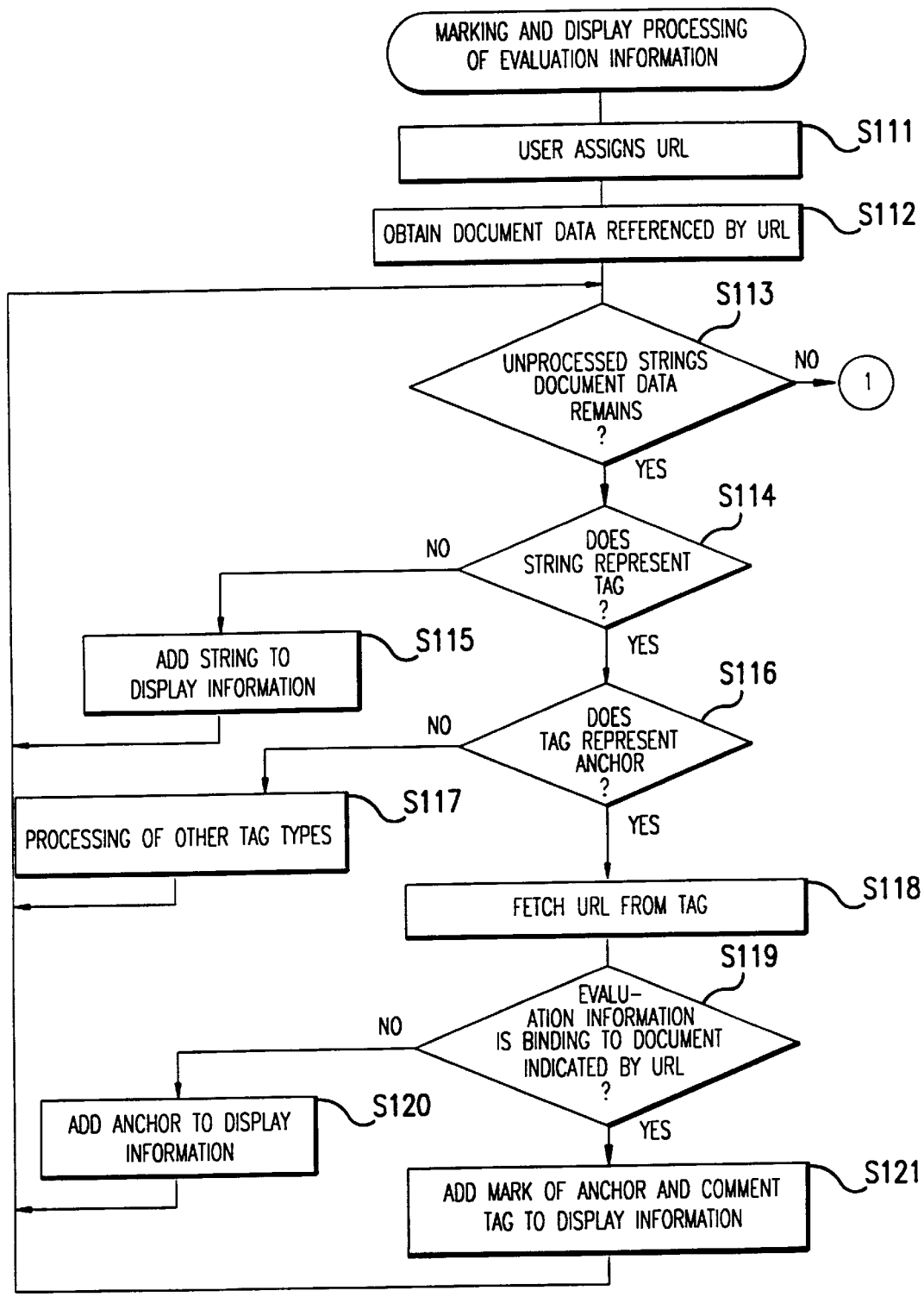
FIG. 39 is a flow chart in the second embodiment of the document management device of the invention showing an example of processing of creating document information display with mark added to indicate attaching of comment tag to anchor and an example of processing of creating evaluation information corresponding to document data.
Figure 40:
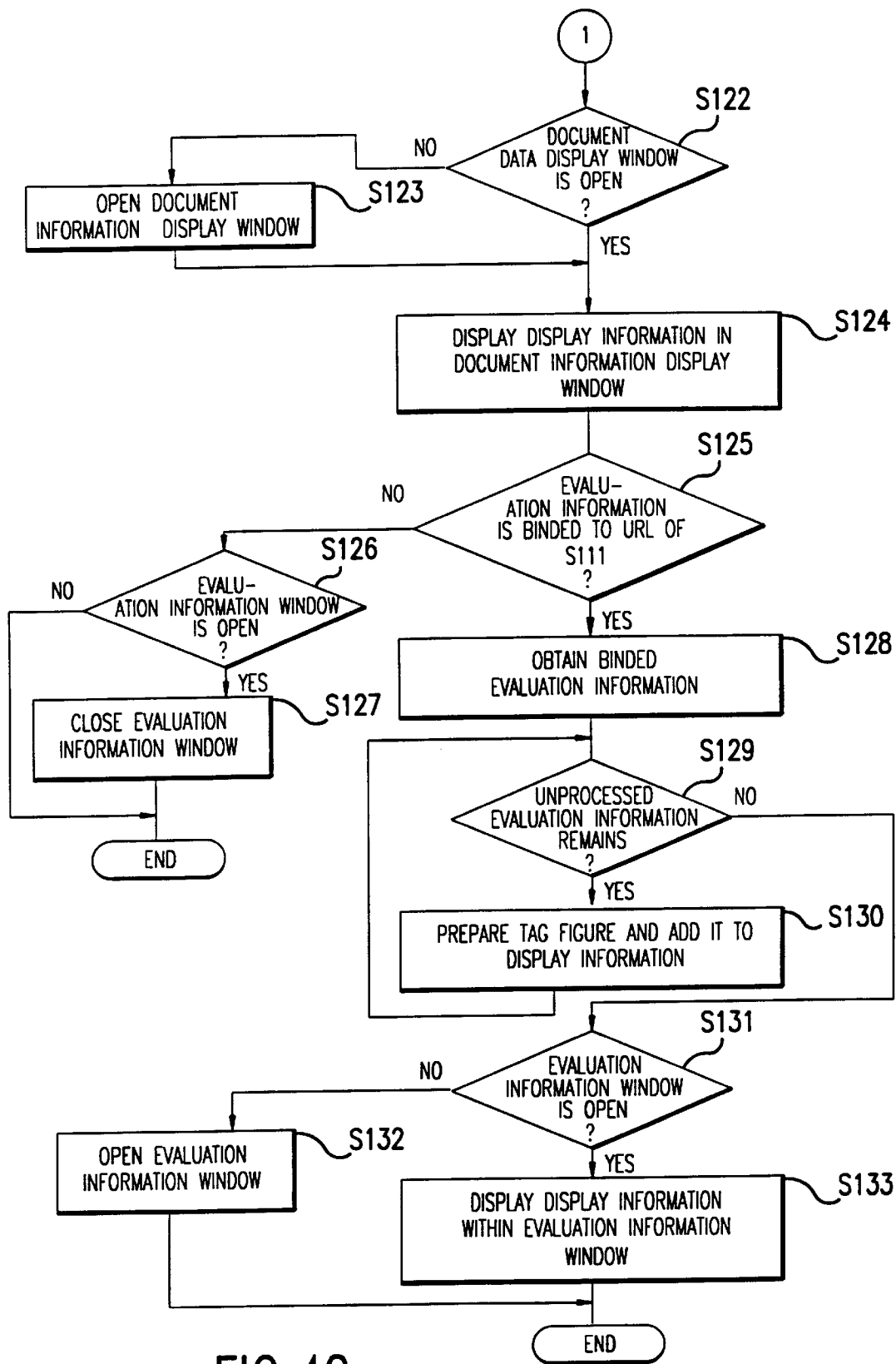
FIG. 40 is a flow chart (continued) in the second embodiment of the document management device of the invention showing an example of processing of creating document information display with mark added to indicate attaching of comment tag to anchor and an example of processing of creating evaluation information corresponding to document data.

FIG. 39 and FIG. 40 are flow charts in the second embodiment of the document management apparatus of the present invention, indicating an example of processing of displaying the document information with the anchor provided with a mark indicating the attaching of the comment tag and an example of processing of displaying the evaluation information bound with the document data. At S111, the user performs input by a keyboard or clicks the anchor by a mouse thereby the URL is assigned. At S112, the document information retrieving section 28 analyzes the URL thereby specifies the WWW server 5, and obtains the document data connected to the WWW server 5 and shown by the URL and delivers the data to the document information display preparation section 23. At S113, decision is effected regarding whether the unprocessed part remains or not in the document data. If it remains, process is advanced to S114, and if not, process is advanced to S122. At S114, decision is effected regarding whether the string loaded from the document data is the HTML tag or not. If it is the HTML tag, process is advanced to S116, and if not, the string is added to the display information in S115 and process is advanced to S113.

At S115, decision is effected regarding whether the HTML tag is the tag indicating hyperlink or not. If it is the tag indicating hyperlink, process is advanced to S118, and if not, at S117, processing of the HTML tag other than hyperlink is performed and process is advanced to S113.

At S118, the URL is fetched from the HTML tag indicating hyperlink and is delivered to the document evaluation information management section 13. At S119, evaluation information including the URL as referenced document is retrieved, and if the evaluation information exists, process is advanced to S121. If no evaluation information, at S120, the anchor is created and added to the display information, and process is advanced to S113. If the evaluation information exists, at S121, the anchor is created and added to the display information, and further graphic data indicating the comment tag previously prepared are added to the display information, and process is advanced to S113.

If all processing regarding the document data are finished, at S122, decision is effected regarding whether the document information display window is created or not, and if it is not created, at S123, the document information display window is created. At S124, the display information is displayed in the document information display window.

At S125, the evaluation information including the URL obtained at S111 as referenced document is retrieved. If the evaluation information exists, process is advanced to S128. If no evaluation information, at S126, decision is effected regarding whether the evaluation information window is created or not. If the evaluation information window is created, at S127, process is advanced to step 14 and the evaluation information window is finished. If the evaluation information window is not created, processing is finished as it is. At S125, if the evaluation information is retrieved, at S128, collection of the evaluation information including the URL as the referenced document is delivered to the document information display preparation section 23, and the document information display preparation section 23 creates new display information for the evaluation information.

At S129, decision is effected regarding whether the unprocessed evaluation information exists or not. If it exists, at S130, the tag figure is created from content of the evaluation information and definition of the tag template corresponding to the evaluation information and added to the display information, and the control is returned to S129. After whole evaluation information is processed, at S131, decision is effected regarding whether the evaluation information window is created or not. If it is not created, at S132, the evaluation information window is created, and at S133, the display information is displayed in the evaluation information window and processing is finished.

Figure 41:
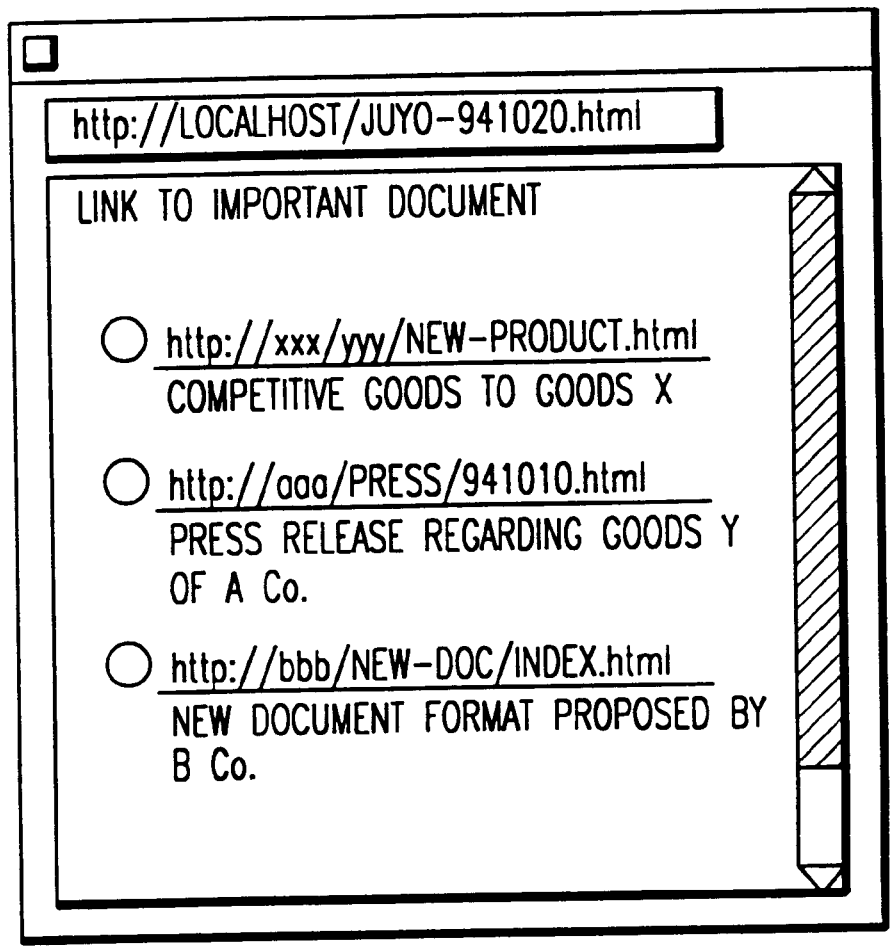
FIG. 41 is an explanation diagram of an example of creation of document data utilizing evaluation information.
Figure 42:
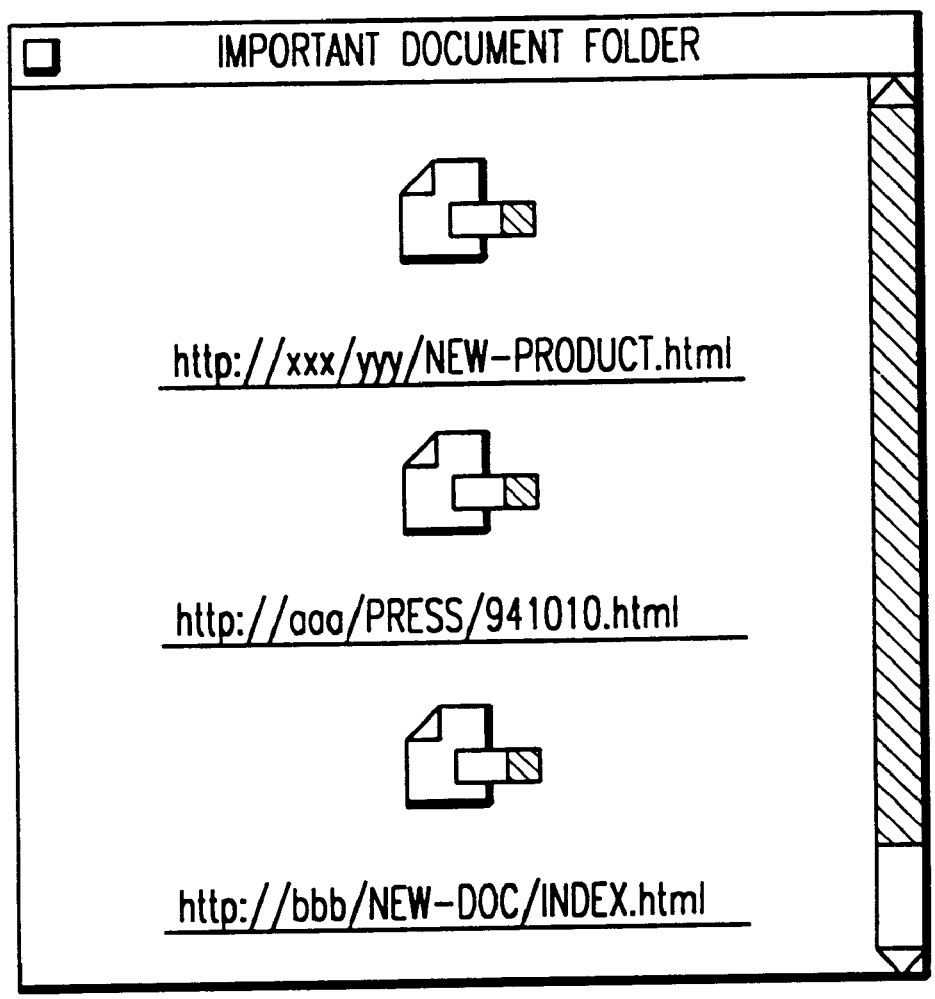
FIG. 42 is an explanation diagram of another example of creation of document data utilizing evaluation information.
Figure 43A:
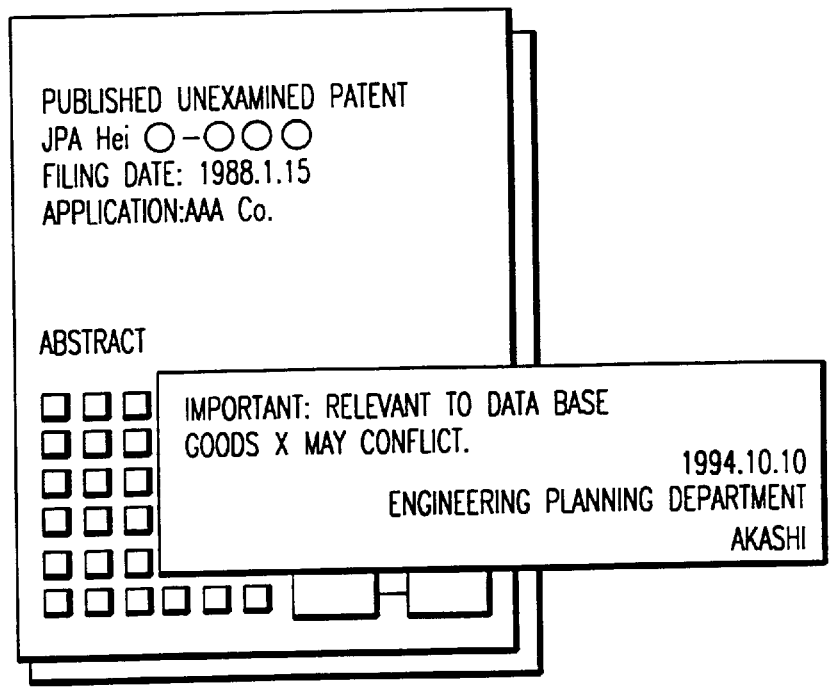
FIGS. 43A–43B are explanation diagrams of an example of memo attaching.
Figure 43B:
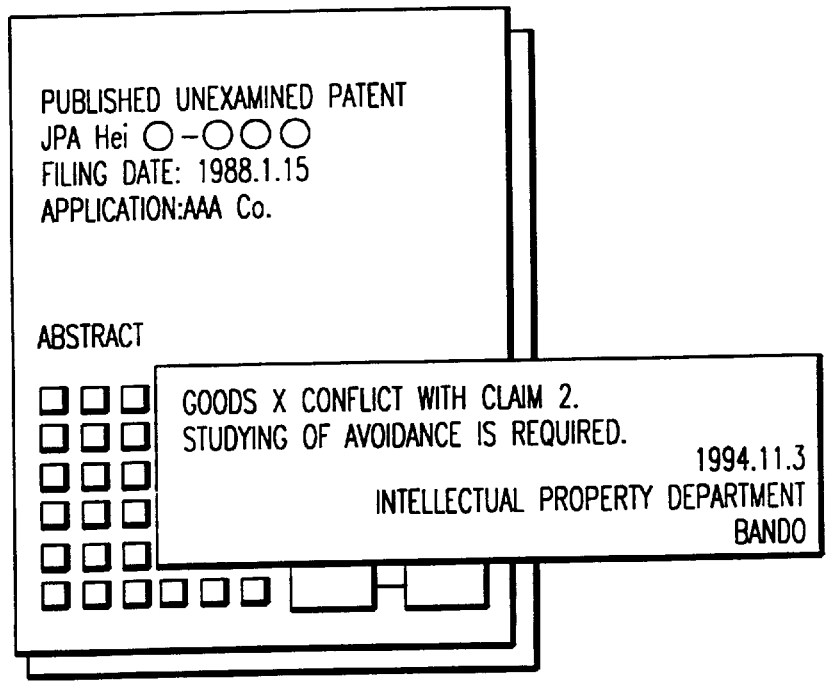
Figure 45:
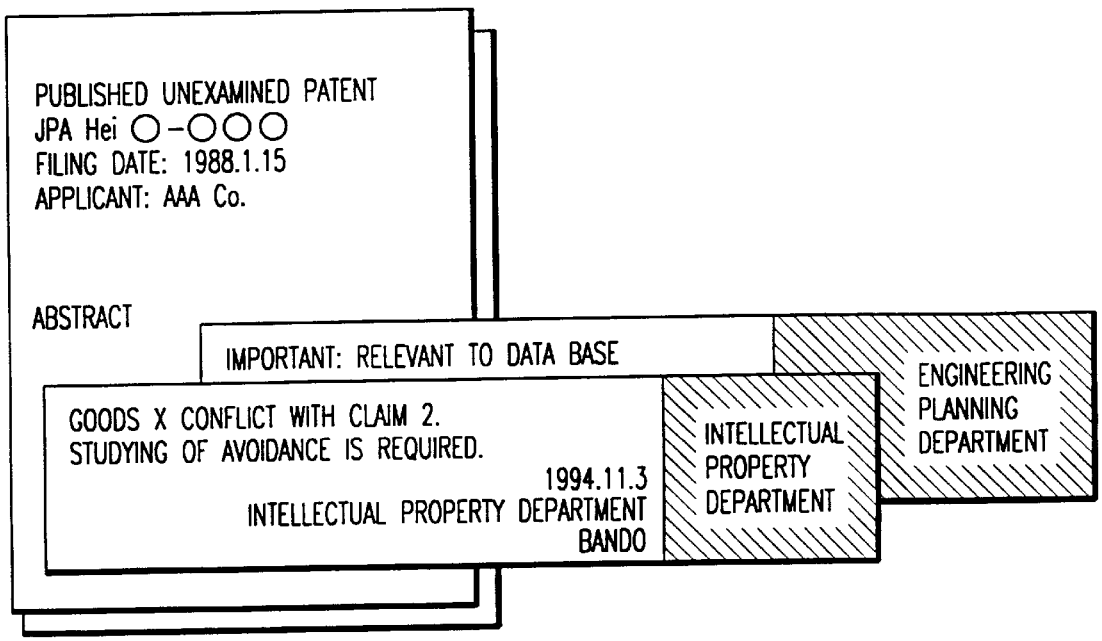
FIG. 45 is explanation diagram of still another example of memo attaching.
Figure 46A:
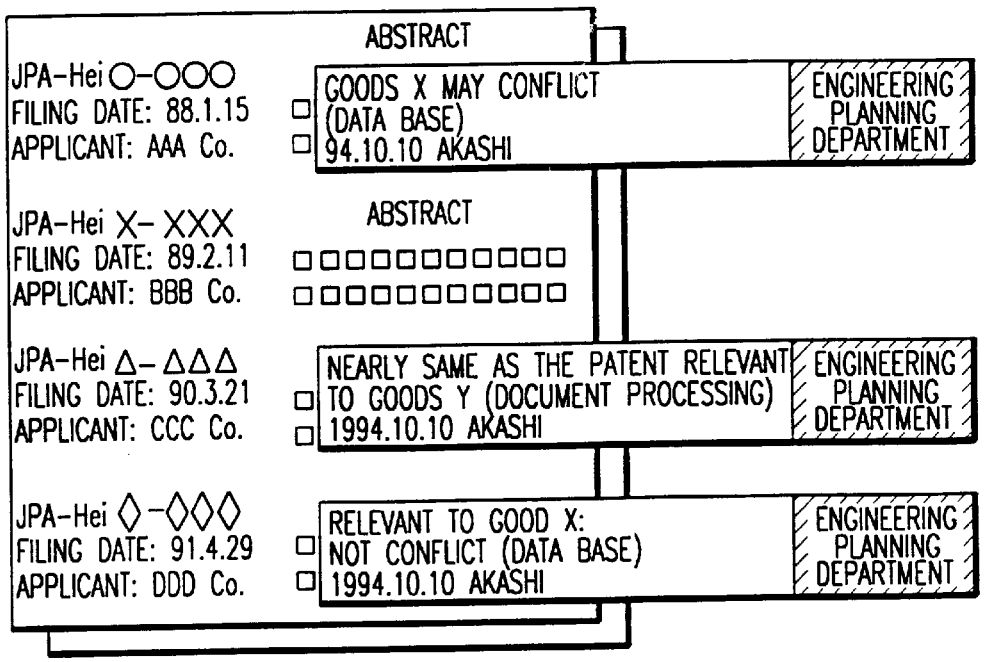
FIGS. 46–46B are explanation diagrams of still another example of memo attaching.
Figure 46B:
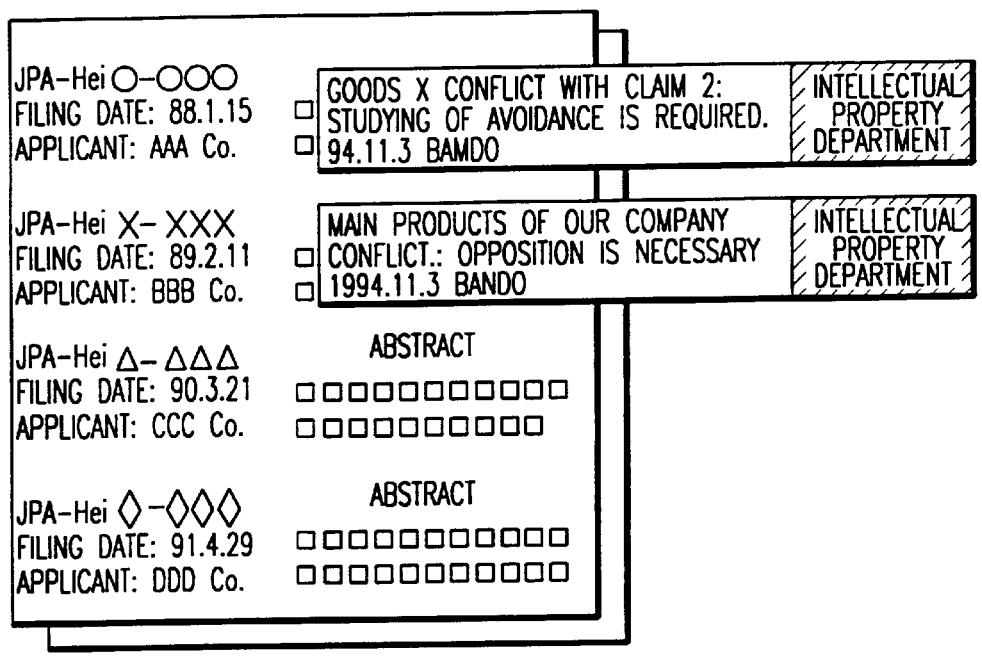

For utilizing the evaluation information, examples of creating new document data based on the content of the evaluation information will be described. FIGS. 41 and 42 are explanation diagrams of creating document data using the evaluation information. FIG. 41 is the example of taking the URL document with the evaluation "important" and the comment among the evaluation information of "engineering" planning department" shown in FIG. 26, and creating the HTML document having the title of "link to important document." In this example, the URL is displayed as the anchor, thereby the corresponding document data can be referred to by selecting the anchor. Other than this method, a method where the comment is displayed as the anchor is conceivable. Differing from the manner described in FIG. 41, various display methods may be employed, including a method of holding, in addition to the URL of the document being object of the document evaluation information, the title of the document, thereby displaying a list of titles as the anchor. Further, as in the example of FIG. 42, a method of displaying the list of the evaluation information using figures not as the document.

As described above, according to the second embodiment of the present invention, it is not necessary to manage the document data as an internal object to which a comment tag can be attached, therefore it is possible to attach a comment tag to the document data which exists in the external environment. Further, in addition to displaying the comment tag together with the document data by specifying the document data, it is possible to retrieve the content of the comment tag and obtaining the referenced document data. Moreover, as described above, the document data can be created from the content of the comment tag.

Having described above, according to the present invention, there can be provided the document management device capable of attaching additional information for the document by simple operation similar to attaching a memo, and managing the document by utilizing the additional information. In the document management device of the present invention, since the additional information is used in similar manner in the method of attaching a memo, the advantage of the memo-attaching method is naturally provided. In addition, the present invention has the following advantages.

First operation on the computer can be performed in the same manner as in the paper references, the operation on the computer is easy to understand. The user need not be conscious of the registration to the database. In other words, by simple operation of attaching the tag to the displayed document data, it is made possible to select the document data to be managed, define the viewpoint for evaluation, and register the document management data from the defined viewpoint. In the prior art the user need consciously proceed these operations.

Further, the data of the evaluation information are inputted, thereby the evaluation information can be highly utilized using the computer. For example, it is made possible to create figures based on the evaluation information using the program creating figures. In addition, using the retrieval function of the database makes it possible to select only the evaluation information of a specific type among various evaluation information given to the reference and to combine different types of evaluation information.

Further, the user's own viewpoint can be freely defined by defining the structure of the evaluation information to thereby easily perform evaluation based on the definition. Other various effects can be realized such that information of various information sources can be managed based on own uniform viewpoint.

What is claimed is:

1. A document management device comprising:
a database for storing and managing document data;
document retrieving means for retrieving the document data from said database;
format storage means for storing at least one evaluation format each of which has an identifier and a plurality of definitions of evaluation attributes, said evaluation format specifying the structure of evaluation data representing evaluation for the document data;
a user interface comprising:
document display means for displaying at least one document data retrieved by said document retrieving means;
document selecting means for selecting one document data among the document data displayed by said document display means;
format selecting means for selecting one of the evaluation formats stored in said format storage means;
at least one comment tag formatted according to the selected evaluation format, the comment tag including attribute value input means for inputting attribute values which are the result of evaluation for the document data selected by said document selecting means from the viewpoint represented by the evaluation attributes defined in the evaluation format selected by said format selecting means;
evaluation data storage means for storing the evaluation data separately from the document data, the evaluation data being a combination of the identifier of the evaluation format selected by said format selecting means and attribute values inputted by said attribute value input means for the evaluation attributes defined by the evaluation format;
binding information creating means for creating binding information which binds the document data selected by said document selecting means with the evaluation data stored in said evaluation data storage means so that the at least one comment tag containing the inputted attribute values is simultaneously displayed with the corresponding selected document data when the selected document data is subsequently displayed on the user interface; and
binding information storage means for storing the binding information created by said binding information creating means.

2. A document management device as set forth in claim 1, further comprising:
retrieval condition input means for inputting the evaluation attribute and the attribute value for the evaluation attribute in combination as retrieval condition; and document data retrieval means for retrieving the document data, based on the retrieval condition inputted by said retrieval condition input means, the evaluation data stored in said evaluation data storage means and the binding information stored in said binding information storage means.

3. A document management device as set forth in claim 2, wherein each of said document data has an inherent attribute which said database attached to the document data, and said retrieval condition input means inputs the evaluation attribute, the attribute value for the evaluation attribute and the inherent attribute in combination as retrieval condition.

4. A document management device as set forth in claim 1, further comprising evaluation data display means for displaying the evaluation data bound with the document data as a tag object indicating the evaluation data according to the evaluation format specifying the evaluation data, in close vicinity of the document data displayed by said document display means.

5. A document management device as set forth in claim 1, wherein said database is connected onto the network, and said document retrieving means accesses the document data stored in said database through the network.

6. A document management device as set forth in claim 1, further comprising:
   attribute definition receiving means for receiving a plurality of definitions of evaluation attributes inputted by a user; and
   evaluation format creating means for creating an evaluation format in combination of the plurality of definitions of evaluation attributes received by said attribute definition receiving means and an identifier, and for storing the evaluation format in said evaluation format storage means.

7. A document management device as set forth in claim 1, wherein said binding information storage means stores address information for referring to the document data selected by said document selecting means in correspondence to the evaluation data, as the binding information.

8. A document management device comprising:
   a database for storing and managing document data;
   format storage means for storing at least one evaluation format each of which has an identifier and a plurality of definitions of evaluation attributes, said evaluation format specifying the structure of the evaluation data representing evaluation for the document data;
   a user interface comprising:
      format selecting means for selecting one of the evaluation formats stored in said format storage means;
      at least one comment tag formatted according to the selected evaluation format, the comment tag including attribute value input means for inputting attribute values which are the result of evaluation from the viewpoint represented by the evaluation attributes defined in the evaluation format selected by said format selecting means;
      retrieval condition input means for inputting the evaluation attribute and the attribute value for the evaluation attribute as a retrieval condition;
   evaluation data storage means for storing the evaluation data separately from the document data, the evaluation data being a combination of the identifier of the evaluation format stored in said format storage means and attribute values for the evaluation attributes defined by the evaluation format;
   binding information storage means for storing binding information which binds the document data stored in said database with the evaluation data stored in said evaluation data storage means so that the at least one comment tag containing the inputted attribute values is simultaneously displayed with the corresponding document data when the corresponding document data is subsequently displayed on the user interface;
   document data retrieval means for retrieving the evaluation data fitted to the retrieval condition from said evaluation data storage means and for retrieving the document data bound to the retrieved evaluation data based on the binding information stored in said binding information storage means.

9. A document management device as set forth in claim 8, wherein said binding information storage means stores address information for referring to the document data stored in said database in correspondence to the evaluation data as the binding information.

10. A document management method of managing document data stored in a storage device, said method comprising:
   registering at least one evaluation format each of which has an identifier and a plurality of definitions of evaluation attributes, said evaluation format specifying the structure of evaluation data representing evaluation for the document data;
   obtaining at least one document data from said storage device;
   displaying the obtained document data on a user interface;
   selecting, from the user interface, one document data from the displayed document data;
   selecting, from the user interface, one evaluation format from said at least one registered evaluation format;
   formatting at least one comment tag according to the selected evaluation format;
   displaying the at least one comment tag on the user interface with the selected document data;
   inputting, into the at least one comment tag, attribute values which are the result viewpoint represented by the evaluation attributes defined by the selected evaluation format;
   storing the evaluation data separately from the document data, the evaluation data being a combination of the identifier of the selected evaluation format and the inputted attribute values for the evaluation attributes defined by the evaluation format;
   creating binding information which binds the selected document data which the stored evaluation data so that the at least one comment tag containing the inputted attribute values is simultaneously displayed with the corresponding selected document data when the selected document data is subsequently displayed on a user interface; and
   storing the created binding information.

11. A document management method as set forth in claim 10, further comprising:
   in putting the evaluation attribute and the attribute value for the evaluation attribute in combination as retrieval condition; and
   retrieving the document data, based on the inputted retrieval condition, the stored evaluation data and the stored binding information.

12. A document management method as set forth in claim 10, wherein each of said document data has an inherent attribute which said database attached to the document data, said method further comprising:

inputting the evaluation attribute, the attribute value for the evaluation attribute and the inherent attribute in combination as retrieval condition; and retrieving the document data, based on the inputted retrieval condition, the stored evaluation data, the stored binding information and the inherent data attached to the document data.

13. A document management method as set forth in claim 10, further comprising displaying the evaluation data bound with the document data as a tag object indicating the evaluation data according to the evaluation format specifying the evaluation data, in close vicinity of the displayed document data.

14. A document management method as set forth in claim 10, wherein said storage device for storing the document data is connected onto the network, said method further comprising obtaining the document data through the network.

15. A document management method as set forth in claim 10, further comprising:

receiving a plurality of definitions of evaluation attributes inputted by a user;

creating the evaluation format in combination of the plurality of received definitions of evaluation attributes and an identifier; and storing the created evaluation format.

16. A document management method as set forth in claim 10, further comprising storing address information for referring to the selected document data in correspondence to the evaluation data as the binding information.

17. A document management method of managing document data stored in a storage device, said method comprising:

registering at least one evaluation format each of which has an identifier and a plurality of definitions of evaluation attributes, said evaluation format specifying the structure of the evaluation data representing evaluation for the document data;

formatting at least one comment tag according to each registered evaluation format;

storing the evaluation data separately from the document data, the evaluation data being a combination of the identifier of the evaluation format and attribute values for the evaluation attributes defined by the evaluation format;

creating binding information which binds the document data with the evaluation data so that the at least one comment tag containing the inputted attribute values is simultaneously displayed with the corresponding selected document data when the selected document data is subsequently displayed on a user interface;

inputting, into a user interface, the evaluation attribute and the attribute value for the evaluation attribute as a retrieval condition;

retrieving the evaluation data fitted to the retrieval condition from said registered evaluation data;

retrieving the document data bound to the retrieved evaluation data based on the registered binding information; and displaying, on the user interface, the at least one comment tag that includes the retrieved evaluation data simultaneously with the retrieved document data.

18. A document method as set forth in claim 17, further comprising registering address information for referring to the document data stored in said storage device in correspondence to the evaluation data, as the binding information.

* * * * *